(12) United States Patent
Yamada

(10) Patent No.: US 8,753,024 B2
(45) Date of Patent: Jun. 17, 2014

(54) SHOCK-ABSORBING MECHANISM FOR MOVABLE MIRROR OF CAMERA

(71) Applicant: Pentax Ricoh Imaging Company, Ltd., Tokyo (JP)

(72) Inventor: Toshiaki Yamada, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 13/660,190

(22) Filed: Oct. 25, 2012

(65) Prior Publication Data

US 2013/0108257 A1      May 2, 2013

(30) Foreign Application Priority Data

Oct. 27, 2011   (JP) .................................. 2011-235970

(51) Int. Cl.
  *G03B 17/00*         (2006.01)
(52) U.S. Cl.
  USPC .......................................................... 396/447
(58) Field of Classification Search
  USPC .......................................................... 396/447
  See application file for complete search history.

(56) References Cited

U.S. PATENT DOCUMENTS 5,606,380 A * 2/1997 Tatamiya ...................... 396/358
5,781,811 A * 7/1998 Shono ........................... 396/358
8,061,908 B2 * 11/2011 Yamana et al. ............... 396/354
2012/0063763 A1 * 3/2012 Yamada ........................ 396/447
2013/0136441 A1 * 5/2013 Yamada ........................ 396/447

FOREIGN PATENT DOCUMENTS

JP          2000-131755        5/2000

OTHER PUBLICATIONS

U.S. Appl. No. 13/231,095 to Toshiaki Yamada, filed Sep. 13, 2011.

* cited by examiner

*Primary Examiner* — Rodney Fuller
(74) *Attorney, Agent, or Firm* — Greenblum & Bernstein P.L.C.

(57) ABSTRACT

A movable mirror shock-absorbing mechanism of a camera includes a mirror rotatable between a viewfinder light-guiding position and a retracted position, and a shock-absorbing member. The shock-absorbing member is held at a stand-by position with a pressure receiving portion thereof spaced from a contact portion provided on the mirror when the mirror is at the viewfinder light-guiding position or the retracted position. When the mirror rotates between the viewfinder light-guiding position and the retracted position, the contact portion presses the pressure receiving portion to move the shock-absorbing member against the biaser, the shock-absorbing member returns to the stand-by position after the pressing of the contact portion is released, and bouncing of the mirror is limited by a contact engagement between the contact portion and the pressure receiving portion.

13 Claims, 23 Drawing Sheets

SHOCK-ABSORBING MECHANISM FOR MOVABLE MIRROR OF CAMERA

BACKGROUND OF THE INVENTION

1. Field of the Invention

The present invention relates to a drive mechanism for driving a movable mirror provided in a camera (e.g., an SLR camera), and in particular to a shock-absorbing mechanism, provided in association with the drive mechanism, for the movable mirror.

2. Description of the Related Art

In SLR cameras, a movable mirror (quick-return mirror) is provided, which is capable of moving up and down; more specifically, capable of rotating between a viewfinder light-guiding position (mirror-down position), in which the movable mirror is positioned in a photographing optical path to reflect incident light emanated from an object (object-emanated light) toward a viewfinder optical system, and a retracted position (mirror-up position), in which the movable mirror is retracted from the photographing optical path to allow the object-emanated light to travel toward a shutter. If the movable mirror bounces (vibrates) due to shock caused upon reaching a rotational limit position such as the viewfinder light-guiding position or the retracted position, this bouncing of the movable mirror makes the image that is viewed through the viewfinder unstable, causing an adverse effect on the viewing performance of the viewfinder. Additionally, in a camera which is structured to lead light from an object to a distance measuring sensor and a photometering sensor via a movable mirror, a precise distance measuring operation or photometering operation cannot be performed during such bouncing of the movable mirror, which restricts continuous photographing performance. Due to such reasons, various shock-absorbing mechanisms which absorb shock of the movable mirror when it rotates to suppress bounce of the movable mirror have been proposed (e.g., Japanese Unexamined Patent Publication No. 2000-131755).

Movable mirror shock-absorbing mechanisms are provided with shock-absorbing members which are pressed by a movable mirror during rotation thereof. The shock-absorbing members absorb the momentum of the movable mirror by applying a load against pressing movement of the movable mirror. The mirror-down position and the mirror-up position, which correspond to rotational limit positions of the movable mirror, are determined by two stoppers, respectively, which are fixed to a mirror box that accommodates the movable mirror. However, if the contact engagement between the movable mirror and a shock-absorbing member is maintained with the movable mirror having reached either rotational limit thereof, there is a possibility of the shock-absorbing member interfering with the positioning of the movable mirror that is determined by the associated stopper. Accordingly, at each rotational limit of the movable mirror, where the movable mirror comes in contact with the associated stopper, it is desirable that the engagement of the movable mirror with the associated shock-absorbing member be released. More specifically, the following measures have been taken: the range of movement of the shock-absorbing member(s) is made to include an overrun range which exceeds a shock-absorbing moving range in which the shock-absorbing member comes into contact with and is pressed and moved by the movable mirror, and the shock-absorbing member is held in the overrun range when the movable mirror reaches the associated rotational limit.

However, as the speed of rotation of the movable mirror is increased to improve a continuous photographing capability, the motion energy of the movable mirror increases, so that a problem arises with already-existing shock-absorbing members not being able to sufficiently reduce bounce of the movable mirror. More specifically, if loads of the shock-absorbing members on the movable mirror are excessively increased to enhance the bounce suppressing effect, there is a possibility of the load on the mechanism for driving the movable mirror excessively increasing or the operational speed of the movable mirror during rotation thereof decreasing. On the other hand, if loads of the shock-absorbing members on the movable mirror are excessively small, motion energy of the movable mirror cannot sufficiently be absorbed, which makes it impossible to prevent the movable mirror from bouncing upon the movable mirror reaching a rotational limit thereof. Accordingly, there has been a problem with it being difficult to set shock-absorbing members for effectively preventing the movable mirror from bouncing without deteriorating the drive performance of the movable mirror.

SUMMARY OF THE INVENTION

The present invention provides a shock-absorbing mechanism, provided for a movable mirror of a camera, which has a superior bounce-suppressing effect for the movable mirror and contributes to an improvement in continuous photographing capability though simple in structure.

According to an aspect of the present invention, a movable mirror shock-absorbing mechanism of a camera is provided, including a movable mirror which is supported to be rotatable between a viewfinder light-guiding position, in which the movable mirror is positioned in a photographing optical path to reflect incident light emanated from an object toward a viewfinder optical system of the camera, and a retracted position, in which the movable mirror is retracted from the photographing optical path to allow the object-emanated light to travel toward a photographic light-receiving medium; and a shock-absorbing member which includes a pressure receiving portion that is capable of contacting a mirror-side contact portion provided on the movable mirror, the shock-absorbing member being held by a biaser at a shock-absorbing stand-by position at which the pressure receiving portion is positioned in a moving path of the mirror-side contact portion, and the shock-absorbing member being movable in a direction to retract the pressure receiving portion from the moving path of the mirror-side contact portion. The shock-absorbing member is held at the shock-absorbing stand-by position with the pressure receiving portion spaced from the mirror-side contact portion when the movable mirror is at one of the viewfinder light-guiding position and the retracted position. When the movable mirror rotates between the viewfinder light-guiding position and the retracted position, the mirror-side contact portion presses the pressure receiving portion to move the shock-absorbing member from the shock-absorbing stand-by position against a biasing force of the biaser, the shock-absorbing member returns to the shock-absorbing stand-by position by the biasing force of the biaser after the pressing of the mirror-side contact portion against the pressure receiving portion is released, and an amount of bouncing of the movable mirror is limited by a contact engagement between the mirror-side contact portion and the pressure receiving portion when the movable mirror bounces.

The moving direction of the shock-absorbing member can be freely determined. For instance, the shock-absorbing member can be supported to be movable linearly in a direction intersecting the moving path of the mirror-side contact portion that is defined when the movable mirror rotates.

Smooth shock-absorbing can be performed with no interference with the operation of the movable mirror if the mirror-side contact portion and the pressure receiving portion include projections, outer peripheral surfaces of which slide on each other when the shock-absorbing member is pressed and moved by the movable mirror.

It is possible for the shock-absorbing member to include a position adjusting mechanism, wherein a position of the pressure receiving portion can be adjusted relative to the mirror-side contact portion via the position adjusting mechanism. This makes it easy to optimize the shock-absorbing capability.

It is possible for the shock-absorbing member to include a first shock-absorbing member which prevents the movable mirror from bouncing at the viewfinder light-guiding position; and a second shock-absorbing member which prevents the movable mirror from bouncing at the retracted position. In this case, the first shock-absorbing member and the second shock-absorbing member are supported to be movable linearly in directions orthogonal to each other.

The number of components of the movable mirror shock-absorbing mechanism can be reduced by the first shock-absorbing member and the second shock-absorbing member being biased toward respective shock-absorbing stand-by positions thereof by a common biaser.

More specifically, the biaser can include a torsion spring including a coil portion which is supported by a support projection, which projects from a mirror box provided in the camera which supports the movable mirror, and a pair of arm portions which extend from the coil portion to be engaged with the first shock-absorbing member and the second shock-absorbing member, respectively.

It is desirable for the biaser to be a spring.

It is desirable for the camera to include a mirror box which includes a pair of laterally-opposed side walls and which accommodates and supports the movable mirror between the pair of laterally-opposed side walls. The first shock-absorbing member and the second shock-absorbing member are positioned alongside one of the pair of laterally-opposed side walls and are supported by the one of the pair of laterally-opposed side walls to be movable linearly in the directions orthogonal to each other.

In an embodiment, a movable mirror shock-absorbing mechanism of a camera is provided, including a movable mirror which is supported to be rotatable between a viewfinder light-guiding position, in which the movable mirror is positioned in a photographing optical path to reflect incident light emanated from an object toward a viewfinder optical system of the camera, and a retracted position, in which the movable mirror is retracted from the photographing optical path to allow the object-emanated light to travel toward a photographic light-receiving medium; a first shock-absorbing member which is pressed by the movable mirror and absorbs the momentum of the movable mirror when the movable mirror rotates from the retracted position to the viewfinder light-guiding position; a second shock-absorbing member which is pressed by the movable mirror and absorbs the momentum of the movable mirror when the movable mirror rotates from the viewfinder light-guiding position to the retracted position; and a common biaser which biases the first shock-absorbing member and the second shock-absorbing member toward respective shock-absorbing stand-by positions, at which the first shock-absorbing member and the second shock-absorbing member apply a load against the pressing movement of the movable mirror.

In the movable mirror shock-absorbing mechanism according to the present invention, the shock-absorbing member that absorbs motion energy of the movable mirror during rotation thereof returns to the shock-absorbing stand-by position at which the shock-absorbing member can come in contact with the movable mirror to limit the amount of bounce upon the movable mirror reaching a rotational limit thereof, such as a viewfinder light-guiding position or and a retracted position. Accordingly, bounce of the movable mirror can be reliably suppressed and the continuous photographing capability can be improved.

The present disclosure relates to subject matter contained in Japanese Patent Application No. 2011-235970 (filed on Oct. 27, 2011) which is expressly incorporated herein by reference in its entirety.

BRIEF DESCRIPTION OF THE DRAWINGS

The present invention will be described below in detail with reference to the accompanying drawings in which.

DESCRIPTION OF THE EMBODIMENT

Figure 1:
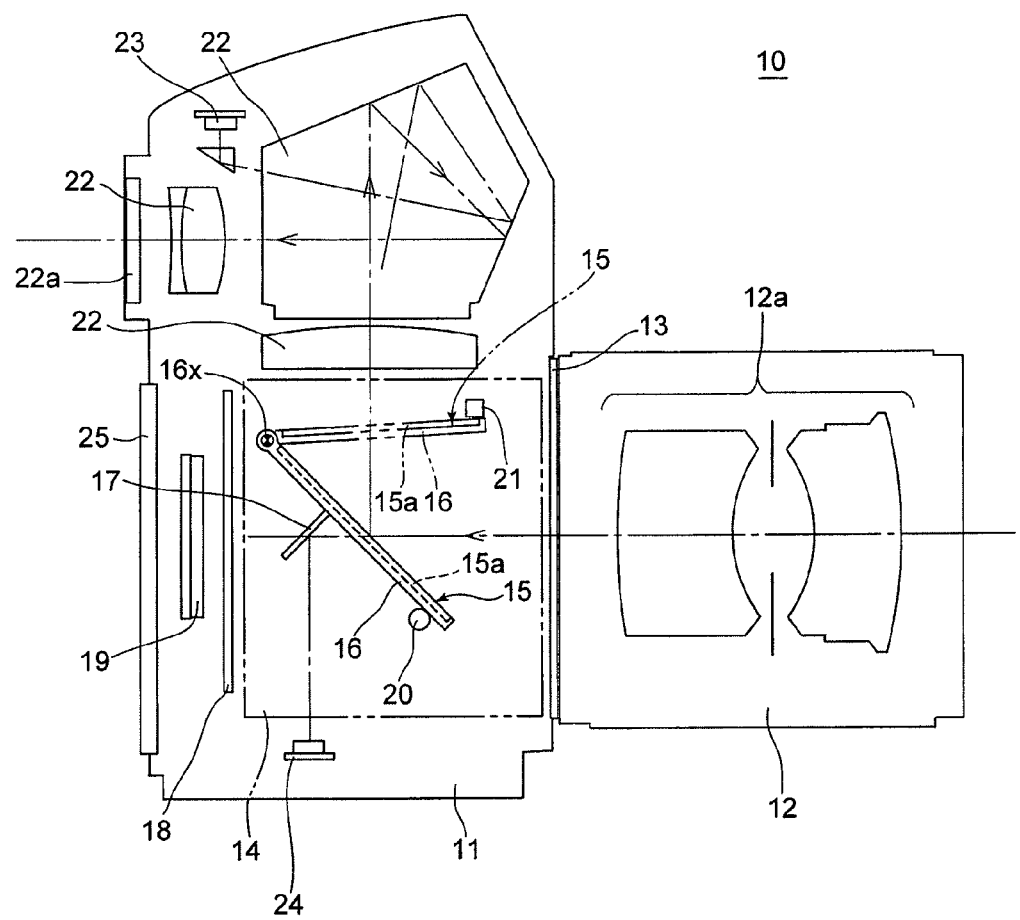
FIG. 1 is a diagram showing a schematic representation of the optical system of an SLR camera according to the present invention.
Figure 2:
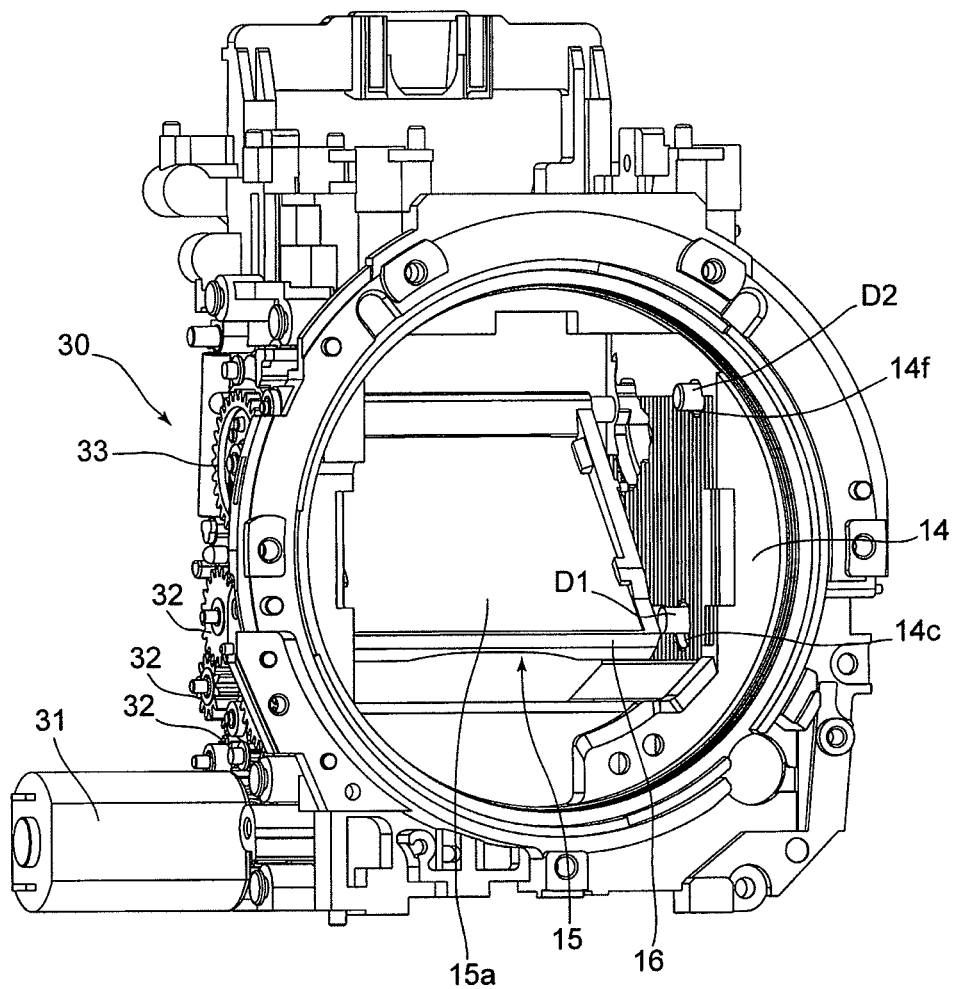
FIG. 2 is a front perspective view of a mirror box unit of the SLR camera in a mirror-down state.

An SLR camera (hereinafter referred simply to as camera) 10 shown in FIG. 1 is provided on the front of a camera body 11 with a lens mount 13, to which an interchangeable lens 12 is detachably attached. The camera 10 is provided, in the camera body 11 behind the lens mount 13, with a mirror box 14.

The camera 10 is provided inside the mirror box 14 with a movable mirror (quick-return mirror) 15. The movable mirror 15 is constructed such that a main mirror 15a is fixedly supported on a mirror seat 16, and a sub-mirror 17 is positioned behind the mirror seat 16 and rotatably supported by the mirror seat 16. A pair of mirror seat hinges (coaxial hinges) 16x which project in laterally opposite directions from both sides of the mirror seat 16 are rotatably supported by both side walls of the mirror box 14, respectively. The camera 10 is provided behind the movable mirror 15 with a focal plane shutter (hereinafter referred simply to as shutter) 18, and is provided behind the shutter 18 with an image sensor (photographic light-receiving medium) 19. The present embodiment of the camera 10 is a digital camera using the image sensor 19 as a photographic light-receiving medium; however, the present invention can also be applied to a camera using silver-salt film as a photographic light-receiving medium.

Figure 6:
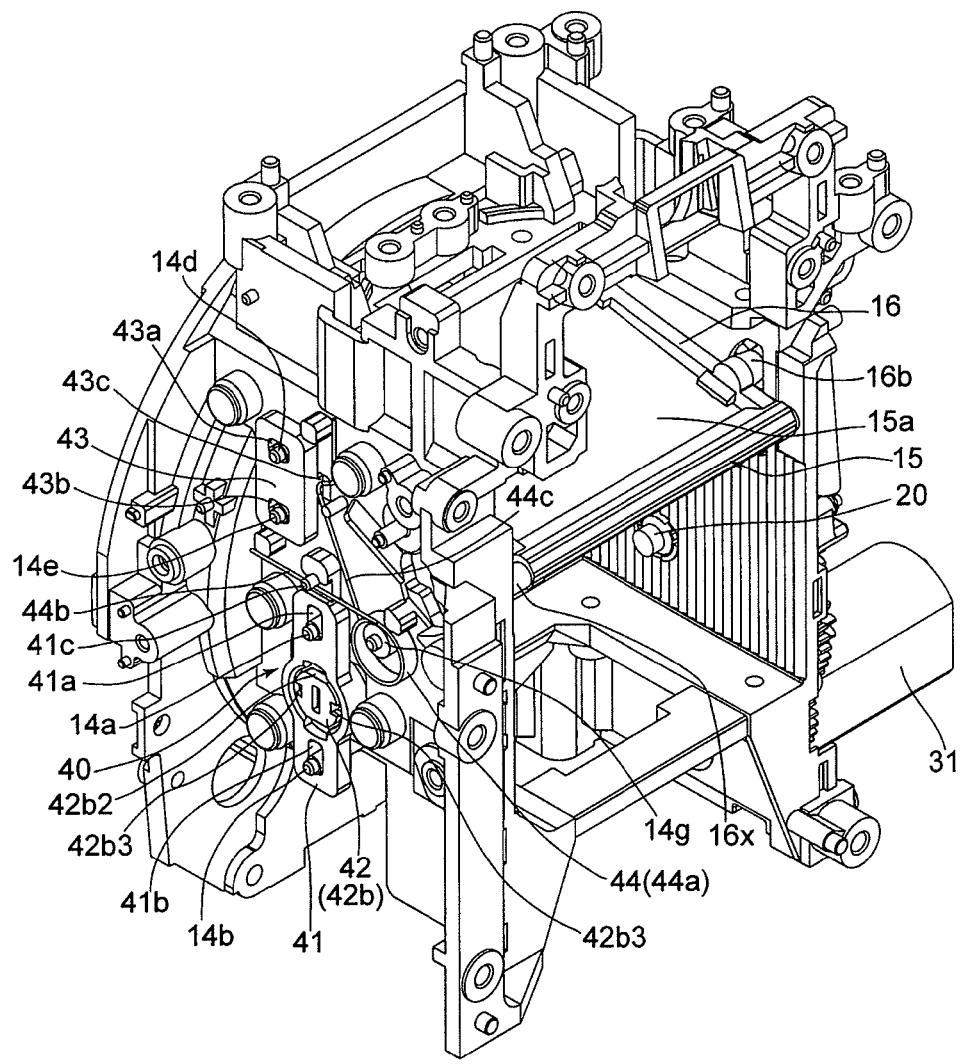
FIG. 6 is a rear perspective view of the mirror box unit in the mirror-up state.
Figure 7:
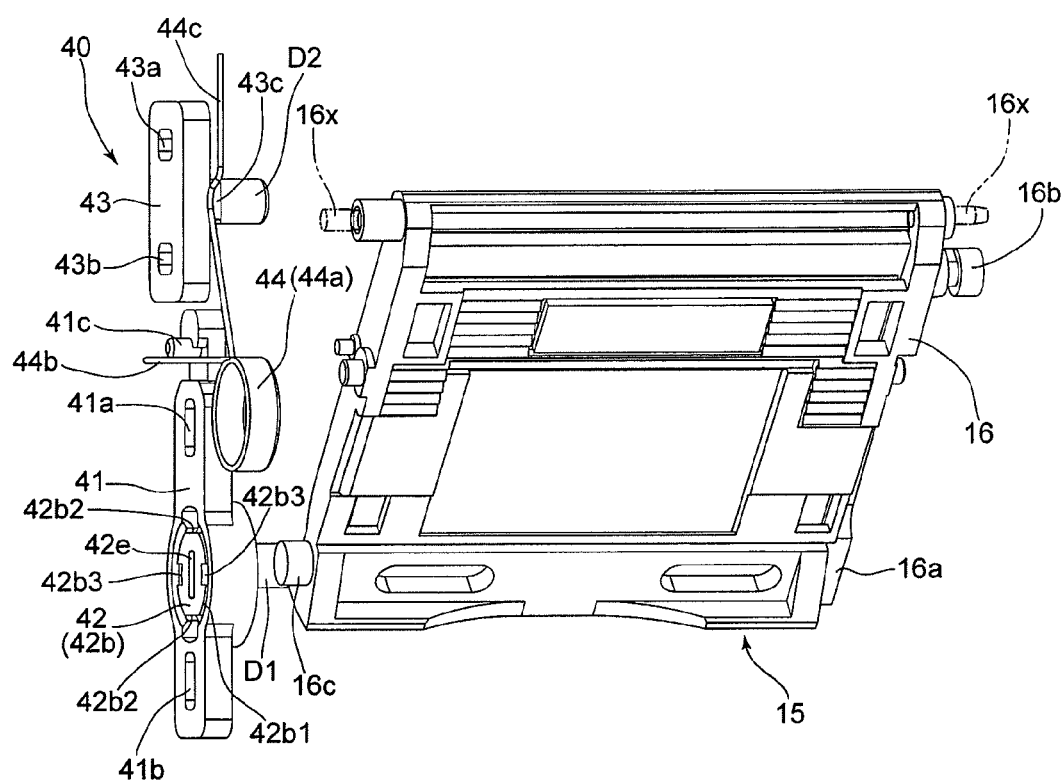
FIG. 7 is a rear perspective view of an embodiment of a mirror shock-absorbing mechanism, showing a state where a contact portion of a mirror seat is in contact with a shock-absorbing pin of a mirror-down shock-absorbing lever.
Figure 8:
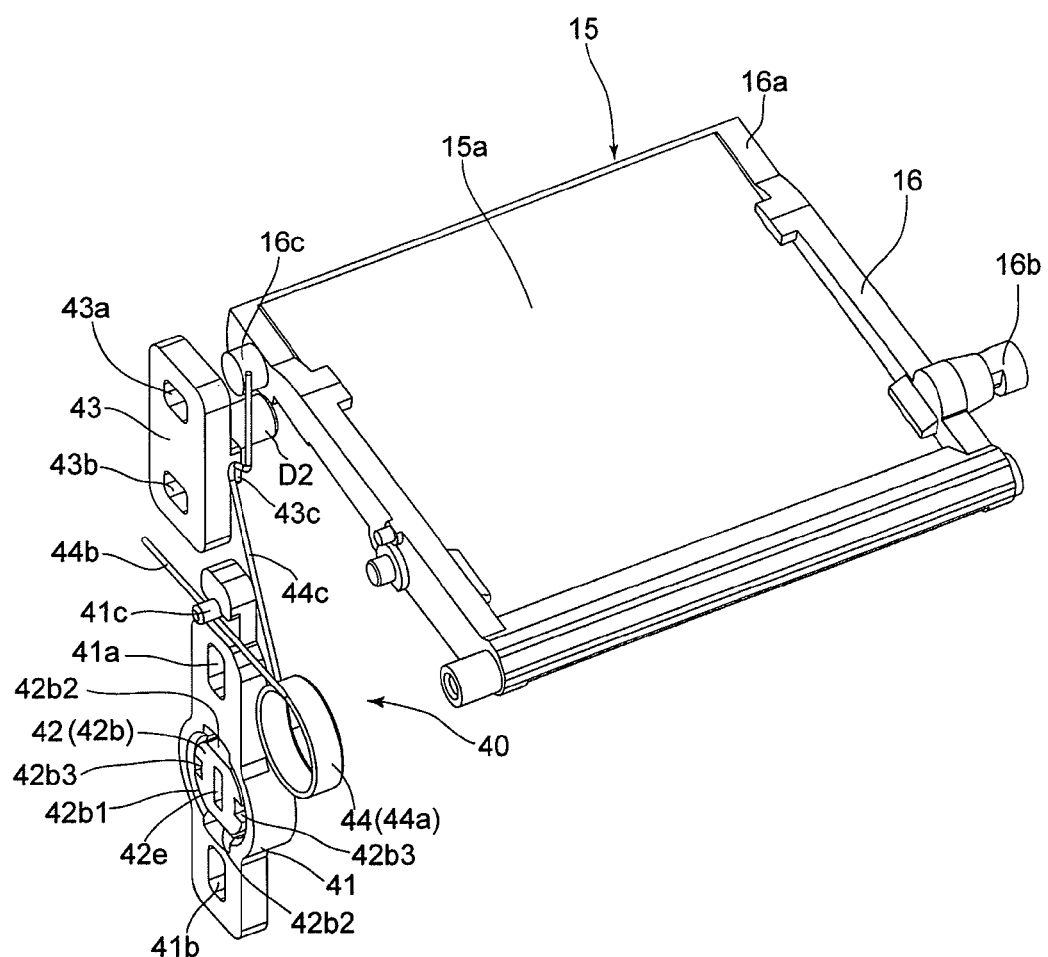
FIG. 8 is a front perspective view of the mirror shock-absorbing mechanism, showing a state where the contact portion of the mirror seat is in contact with a shock-absorbing pin of a mirror-up shock-absorbing lever.

The movable mirror 15 reciprocatively rotates (swings) about the pair of mirror seat hinges 16x between a mirror-down position (viewfinder light-guiding position; shown by solid lines in FIG. 1 and also shown in FIGS. 2, 4, 5 and 10), in which the movable mirror 15 is positioned in a photographing optical path which extends from a photographing lens system 12a provided in the interchangeable lens 12 to the image sensor 19, to be inclined at an angle of approximately 45 degrees with respect to the photographing optical path, and a mirror-up position (retracted position; shown by one-dot chain lines in FIG. 1 and also shown in FIGS. 3, 6 and 13), in which the movable mirror 15 is retracted upward from the photographing optical path. As shown in FIGS. 4 and 6, a mirror-down position defining pin 20 projects inside the mirror box 14 from an inner surface of one of the side walls of the mirror box 14 that are positioned on laterally both sides of the movable mirror 15, and the mirror-down position of the movable mirror 15 is defined by engagement of the mirror-down position defining pin 20 with a stopper 16a (see FIGS. 7 and 8) formed on a side of the mirror seat 16. The installation position of the mirror-down position defining pin 20 to the mirror box 14 can be finely adjusted. In addition, an upper stopper 21 is fixedly installed inside the mirror box 14. An upper surface of the mirror seat 16 comes into contact with the upper stopper 21 when the movable mirror 15 rotates to the mirror-up position. The camera 10 is provided therein, above the movable mirror 15, with a viewfinder optical system 22 that is configured of a pentagonal prism, an eyepiece lens and other optical elements.

Object-emanated light which enters the mirror box 14 through the photographing lens system 12a in the interchangeable lens 12, with the interchangeable lens 12 mounted to the lens mount 13, is reflected by the main mirror 15a of the movable mirror 15 to be incident on the viewfinder optical system 22 and observable through a viewfinder window 22a formed in the back of the camera body 11. In this state, a photometering operation using a photometering unit 23 which is installed behind the pentagonal prism of the viewfinder optical system 22 can be carried out. In addition, when the movable mirror 15 is in the mirror-down position, the sub-mirror 17 projects obliquely downwards from the underside of the mirror seat 16 to reflect part of the object-emanated light downward to be incident on a distance measuring unit 24, which makes it possible to detect an object distance. On the other hand, when the movable mirror 15 is in the mirror-up position, the object-emanated light which enters the mirror box 14 through the photographing lens system 12a travels toward the shutter 18 without being reflected by the movable mirror 15, thus being capable of being made incident on the light receiving surface of the image sensor 19 by opening the shutter 18. When the movable mirror 15 is in the mirror-up position, the sub-mirror 17 is retracted at the underside of the mirror seat 16. Electronic object images obtained via the image sensor 19 and various other information can be displayed on an LCD monitor 25 provided on the back of the camera body 11.

Figure 3:
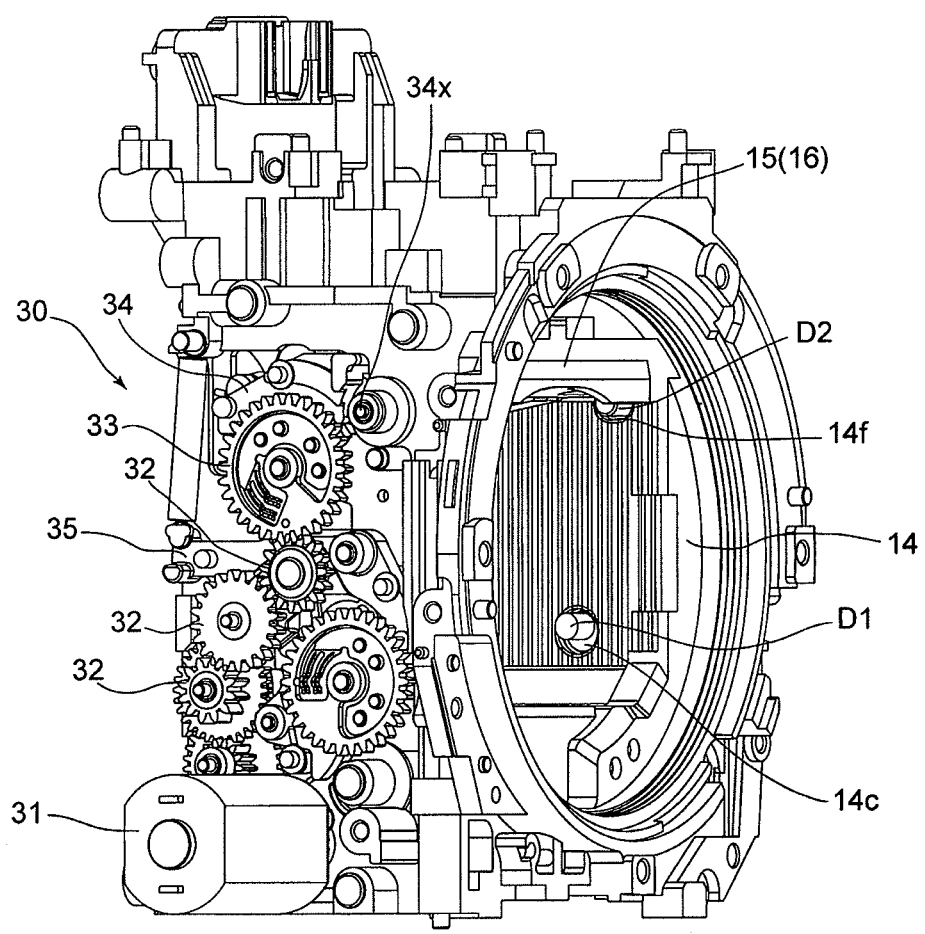
FIG. 3 is a front perspective view of the mirror box unit in a mirror-up state.
Figure 4:
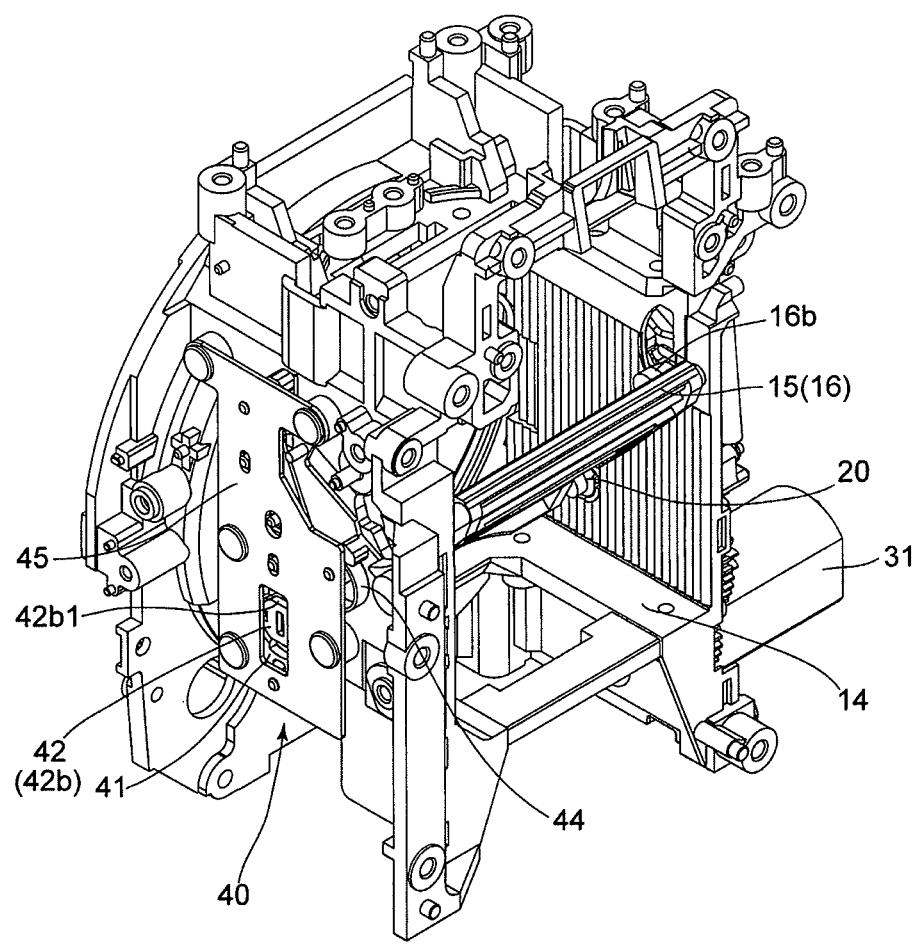
FIG. 4 is a rear perspective view of the mirror box unit in the mirror-down state.
Figure 5:
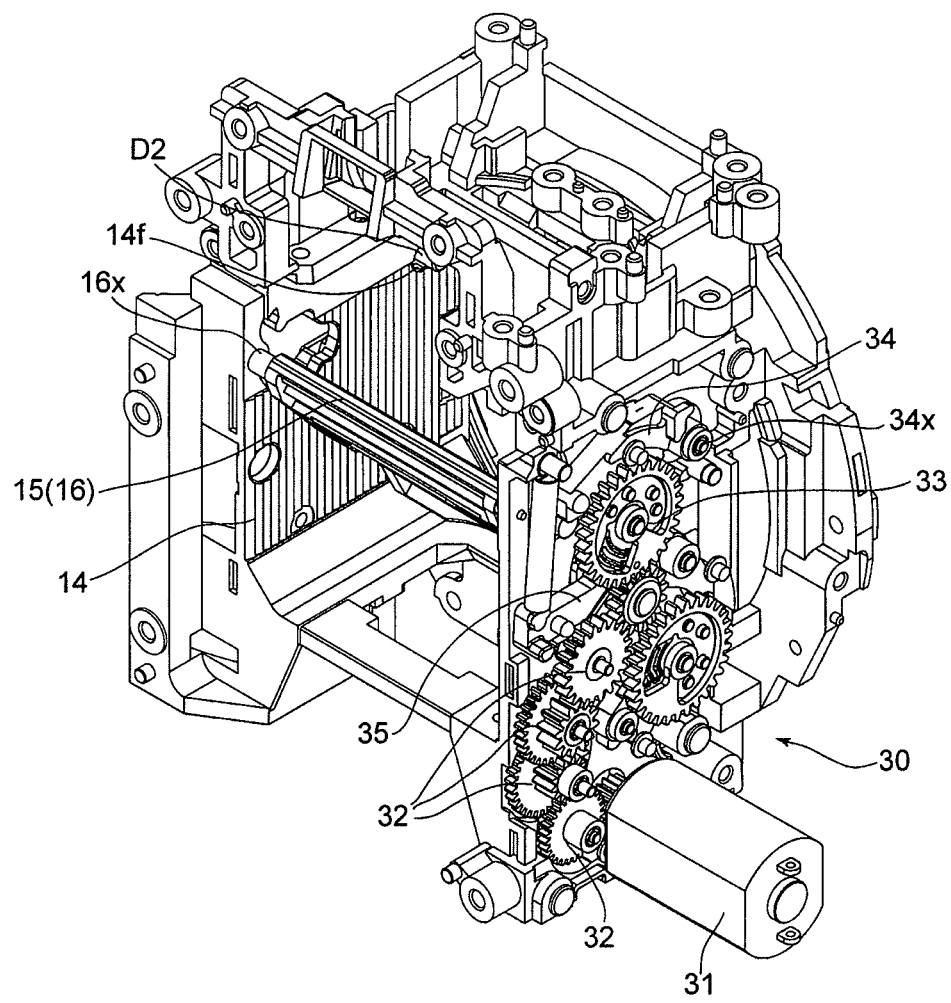
FIG. 5 is a rear perspective view of the mirror box unit in the mirror-down state.

As shown in FIGS. 3 and 5, the camera 10 is provided with a mirror drive mechanism 30, on a side (left side as viewed from front) of the mirror box 14, which drives the movable mirror 15 to rotate the movable mirror 15 up and down. The mirror drive mechanism 30 is provided with a motor 31, a reduction gear train 32 which transmits a driving force of the motor 31, a cam gear 33 to which the rotational driving force is transmitted from the reduction gear train 32 via a planetary gear mechanism, and a mirror drive lever 34, the rotational position of which is controlled by the cam gear 33. The mirror drive lever 34 is supported by the mirror box 14 to be reciprocatively rotatable (swingable) about an axis 34x which is substantially parallel to the axis of the pair of mirror seat hinges 16x. The mirror drive lever 34 holds a mirror seat boss 16b which is formed on a side of the mirror seat 16. Pressing the mirror seat boss 16b downward by a holding portion of the mirror drive lever 34 which holds the mirror seat boss 16b causes the movable mirror 15 to rotate downward, toward the mirror-down position, and pressing the mirror seat boss 16b upward by the same holding portion causes the movable mirror 15 to rotate upward, toward the mirror-up position. The mirror drive lever 34 is biased to rotate in a direction to press the movable mirror 15 toward the mirror-down position. When the cam gear 33 is located at a specific rotational position, the mirror drive lever 34 is pressed and rotated toward the mirror-up position against the biasing force by a mirror control cam (peripheral surface cam) formed on the cam gear 33. More specifically, the cam gear 33 is a single-rotation cam gear which is rotated only in one direction from an initial position. When the cam gear 33 is in the initial position, the mirror control cam of the cam gear 33 does not press the mirror drive lever 34, so that the movable mirror 15 is held in the mirror-down position by a biasing force which acts on the mirror drive lever 34. A rotation of the cam gear 33 partway from the initial position causes the mirror control cam of the cam gear 33 to press and rotate the mirror drive lever 34, which causes the mirror drive lever 34 to rotate the movable mirror 15 to the mirror-up position. During the time the cam gear 33 returns to the initial position from this partway position, the mirror control cam of the cam gear 33 releases the pressure against the mirror drive lever 34, so that the movable mirror 15 returns to the mirror-down position.

The camera 10 is provided on the left side of the mirror box 14, to which the mirror drive mechanism 30 is installed, with a shutter charge lever 35 which makes the shutter 18 perform a shutter charge operation. In addition to the aforementioned mirror control cam, the cam gear 33 is further provided with a shutter charge cam for controlling the operation of the shutter charge lever 35. One rotation of the cam gear 33 from the initial position causes the shutter charge lever 35 to reciprocatively rotate to make the shutter 18 perform the shutter charge operation. The shutter charge operation is not related to the features of the present invention, and therefore the detailed description of the shutter charge operation is omitted in the following description.

Figure 9:
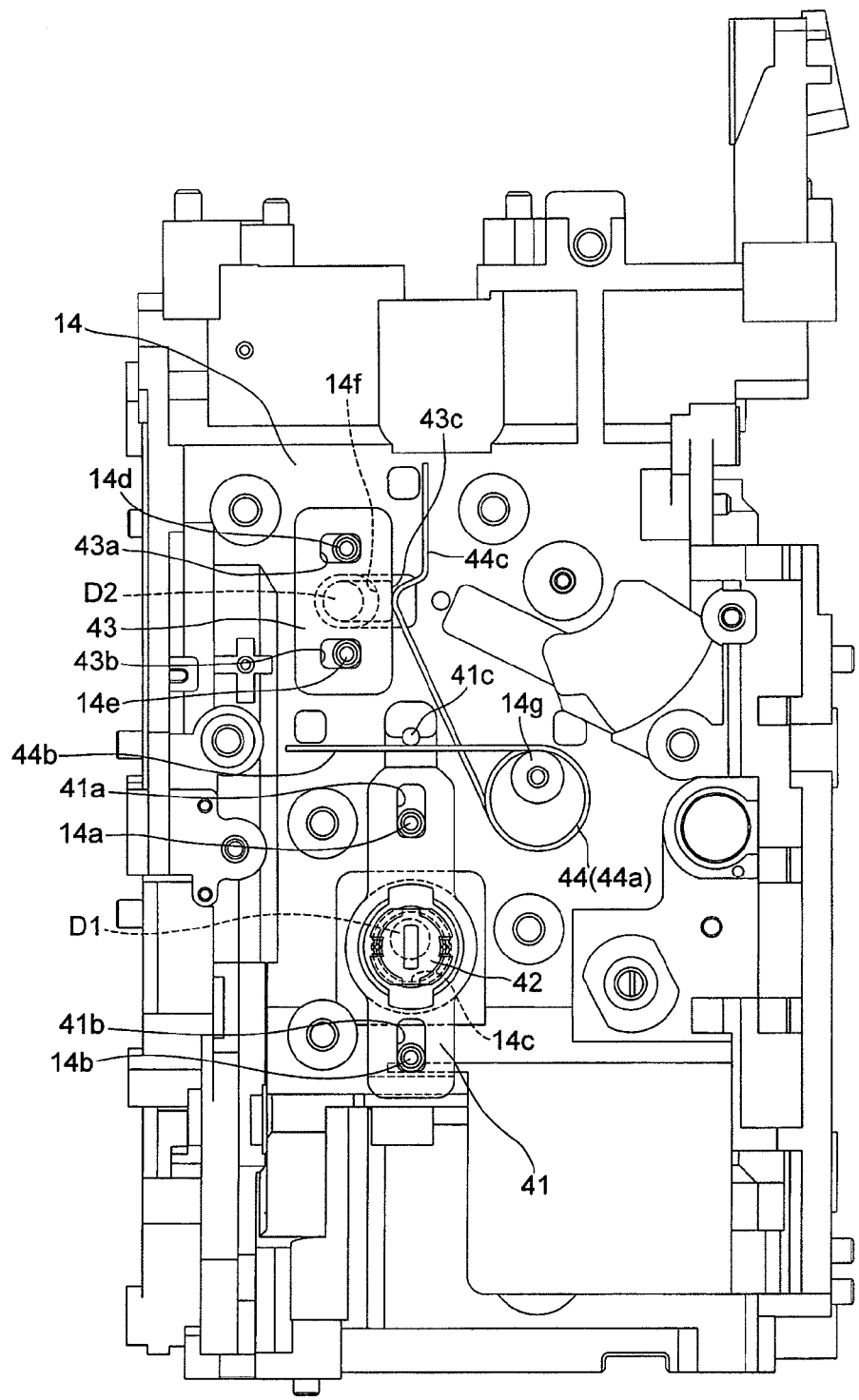
FIG. 9 is a left side elevational view of the mirror box unit with a retaining plate removed to expose the mirror shock-absorbing mechanism.

The camera 10 is provided on the other side of the mirror box 14 (the right side of the mirror box 14 as viewed from the front) with a mirror shock-absorbing mechanism 40 which absorbs shock of the movable mirror 15 that is caused upon rotation of the movable mirror 15 to the mirror-down position or the mirror-up position to reduce bouncing (vibration) of the movable mirror 15. The mirror shock-absorbing mechanism 40 is provided with a mirror-down shock-absorbing lever (shock-absorbing member/first shock-absorbing member) 41, an adjustment member (shock-absorbing member/first shock-absorbing member) 42, a mirror-up shock-absorbing lever (shock-absorbing member/second shock-absorbing member) 43 and a shock-absorbing spring (biaser/common biaser) 44. The mirror-down shock-absorbing lever 41, the adjustment member 42, the mirror-up shock-absorbing lever 43 and the shock-absorbing spring 44 are held so as not to come off the mirror box 14 by a retaining plate 45 (see FIG. 4) fixed to a side of the mirror box 14. FIGS. 6 and 9 each show a state where the retaining plate 45 is removed for clarity.

The mirror-down shock-absorbing lever 41 and the adjustment member 42 constitute a shock absorber for absorbing shock of the movable mirror 15 and suppressing bounce of the movable mirror 15 when the movable mirror 15 rotates to the mirror-down position. The mirror-down shock-absorbing lever 41 is provided with an upper guide hole 41a and a lower guide hole 41b into which an upper pin 14a and a lower pin 14b, which are formed on the mirror box 14 to project therefrom, are engaged, respectively. The upper guide hole 41a and the lower guide hole 41b are elongated and aligned in the vertical direction. The mirror-down shock-absorbing lever 41 is supported by the mirror box 14 to be linearly movable in the vertical direction in a plane orthogonal to the axis of the pair of mirror seat hinges 16x with the upper guide hole 41a and the lower guide hole 41b guided linearly by the upper pin 14a and the lower pin 14b, respectively. The mirror-down shock-absorbing lever 41 is provided, in the vicinity of the upper end thereof, with a spring hook 41c.

Figure 18:
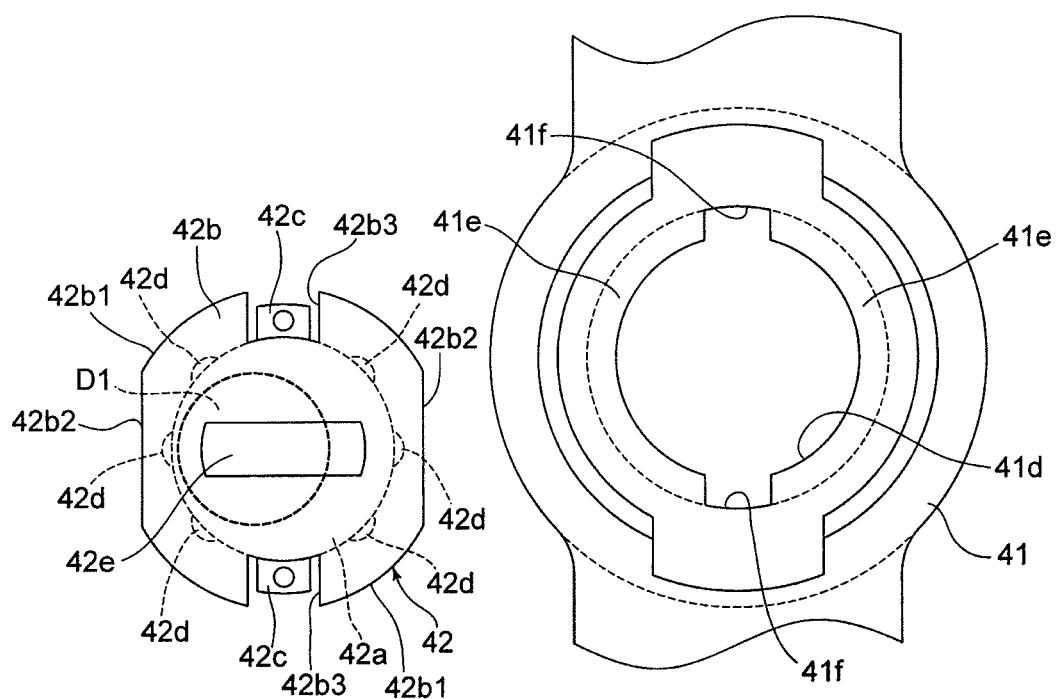
FIG. 18 is a diagram showing a state where an adjustment member is removed from the mirror-down shock-absorbing lever.

As shown in FIG. 18, the mirror-down shock-absorbing lever 41 is provided between the guide holes 41a and 41b with a fitting hole 41d, and the adjustment member 42 is fitted into the fitting hole 41d and supported thereby. The mirror-down shock-absorbing lever 41 is provided with an annular flange 41e around the fitting hole 41d, and a pair of cutouts 41f are formed on the annular flange 41e. The adjustment member 42 is provided with a shaft portion 42a (see FIGS. 18 through 23), a flange portion 42b and a pair of lugs 42c. The shaft portion 42a fits into the fitting hole 41d. The flange portion 42b is greater in diameter than the shaft portion 42a and in contact with the annular flange 41e. The pair of lugs 42c are formed to be capable of passing through the pair of cutouts 41f, respectively, at a position different from the position of the flange portion 42b in the axial direction of the shaft portion 42a. As shown in FIG. 18, the pair of lugs 42c are formed to be substantially symmetrical with respect to the central axis of the shaft portion 42a when the adjustment member 42 is viewed in a plan view. The flange portion 42b is provided as its basic form with a circular portion 42b1 which is concentric with the shaft portion 42a, and the flange portion 42b is further provided with a pair of planar portions 42b2 which are formed by linearly cutting off radially opposite parts (the laterally opposite parts with respect to FIGS. 18 and 19) of the circular portion 42b1, and a pair of recessed portions 42b3 which are formed by cutting off other radially opposite parts (the vertically opposite parts with respect to FIGS. 18 and 19) of the circular portion 42b to be recessed radially inwards. The pair of planar portions 42b2 are substantially parallel to each other and positioned substantially symmetrical with respect to the central axis of the shaft portion 42a. The pair of recessed portions 42b3 are formed at circumferential positions corresponding to the circumferential positions of the pair of lugs 42c to allow the pair of lugs 42c to be viewed from the flange portion 42b side through the pair of recessed portions 42b3, respectively. The adjustment member 42 is provided on an outer peripheral surface of the shaft portion 42a with a plurality of guide protrusions 42d which protrude radially outwards to contact with the inner peripheral surface of the fitting hole 41d. In addition, the adjustment member 42 is provided at one end of the shaft portion 42a with a recessed portion 42e into which a tool (not shown) used to perform an adjusting operation is fitted, and is further provided at the other end of the shaft portion 42a with a shock-absorbing pin (pressure receiving portion) D1 which projects toward the inside of the mirror box 14. The shock-absorbing pin D1 is positioned at a position eccentric from the axis of the shaft portion 42a, so that rotating the adjustment member 42 with the shaft portion 42a fitted into the fitting hole 41d causes the position of the shock-absorbing pin D1 to vary relative to the mirror-down shock-absorbing lever 41.

Figure 19:
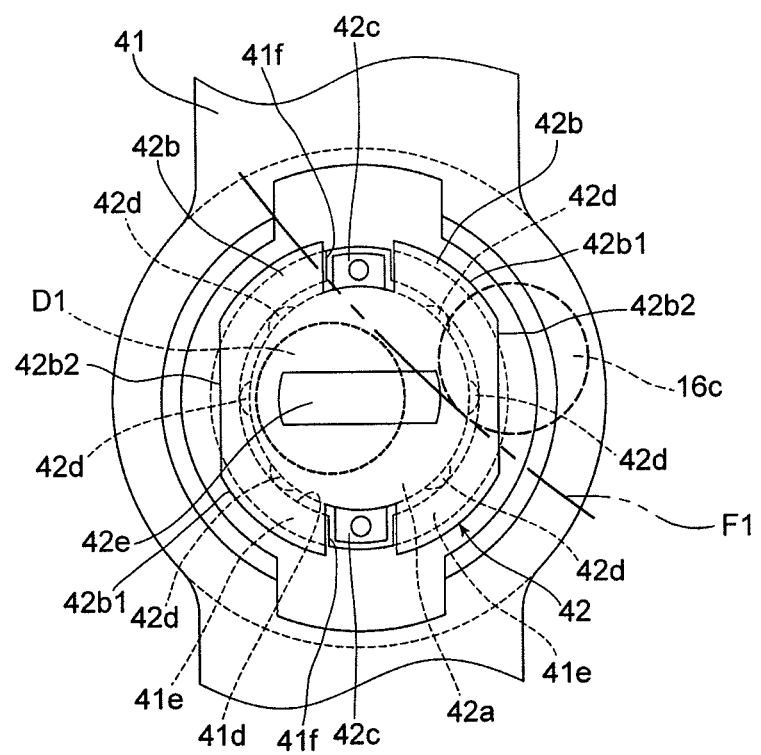
FIG. 19 is a diagram showing the installation position of the adjustment member to the mirror-down shock-absorbing lever.
Figure 20:
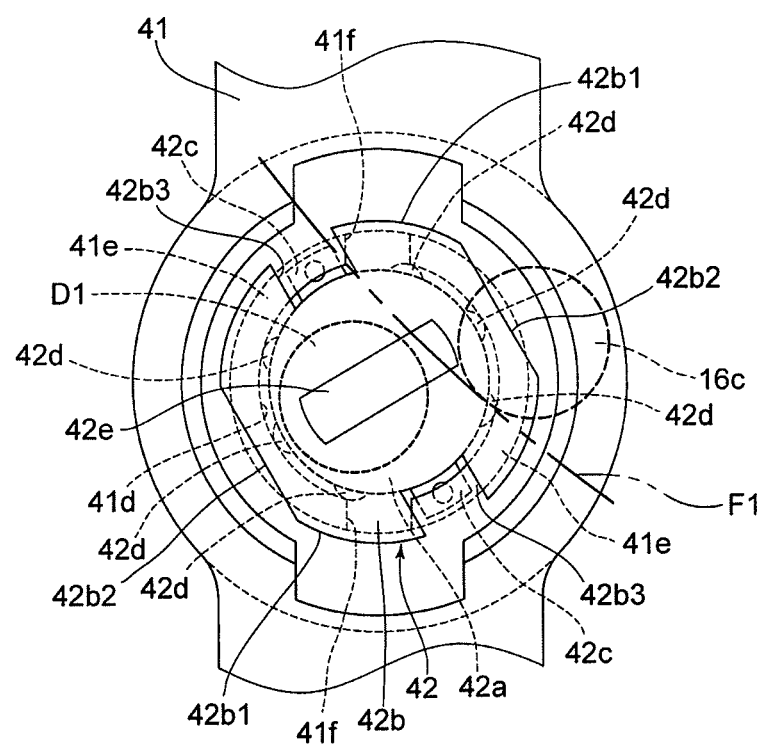
FIG. 20 is a diagram showing the angular position of the adjustment member when the mirror-down position of the movable mirror is adjusted.

The adjustment member 42 can be detachably attached to the mirror-down shock-absorbing lever 41 at a predetermined angular position shown in FIG. 19. When the adjustment member 42 is attached to the mirror-down shock-absorbing lever 41, the pair of lugs 42c are passed through the pair of pair of cutouts 41f, and the shaft portion 42a is fitted into the fitting hole 41d. The angular position of the adjustment member 42 at which it can be detachably attached to the mirror-down shock-absorbing lever 41 can be visually checked by using the pair of recessed portions 42b3 (the pair of lugs 42c that are seen through the pair of recessed portions 42b3) or the pair of planar portions 42b2 as indexes. The position of the adjusting member 42 in the insertion direction thereof with respect to the fitting hole 41d is determined by the contact engagement of the flange portion 42b with the annular flange 41e. The adjustment member 42, with the shaft portion 42a thereof fitted into the fitting hole 41d, can vary in angular position with respect to the mirror-down shock-absorbing lever 41 while sliding the plurality of guide protrusions 42d on the inner peripheral surface of the fitting hole 41d. The adjusting operation to adjust the angular position of the adjustment member 42 can be performed using the aforementioned tool (not shown) that fits into the recessed portion 42e. One can perform this adjusting operation while holding the pair of planar portions 42b2 or the pair of recessed portions 42b3 of the flange portion 42b.

When the pair of lugs 42c have been positioned at the rear side of the annular flange 41e as shown in FIGS. 20 through 23 by rotating the adjusting member 42 from the detachable/attachable position shown in FIG. 19, the adjusting member 42 is prevented from being removed through the fitting hole 41d, thus becoming integral with the mirror-down shock-absorbing lever 41. In this integrated state, the pair of lugs 42c and the flange portion 42b holds the annular flange 41e therebetween at a predetermined degree of pressure, so that the adjusting member 42 does not unexpectedly rotate relative to the mirror-down shock-absorbing lever 41. Therefore, in the above-mentioned integrated state, the adjusting member 42 moves with the mirror-down shock-absorbing lever 41. When the mirror-down shock-absorbing lever 41 to which the adjusting member 42 is mounted is installed onto the mirror box 14 to be supported thereby, the shock-absorbing pin D1 projects inside the mirror box 14 through a through-hole 14c formed through the mirror box 14 (see FIGS. 2 and 3). The through-hole 14c is formed so that the size thereof does not interfere with positional variations of the shock-absorbing pin D1 that occur in association with movement of the mirror-down shock-absorbing lever 41.

The mirror-up shock-absorbing lever 43 constitutes a shock-absorbing member which absorbs shock of the movable mirror 15 and suppresses bounce of the movable mirror 15 when the movable mirror 15 rotates to the mirror-up position. The mirror-up shock-absorbing lever 43 is provided with two guide holes 43a and 43b into which two guide pins, i.e., an upper guide pin 14d and a lower guide pin 14e, which are formed on a side of the mirror box 14 to project therefrom, are respectively inserted. The two guide holes 43a and 43b are elongated and aligned in the horizontal direction. The mirror-up shock-absorbing lever 43 is supported and guided linearly in a direction orthogonal to the moving direction of the mirror-down shock-absorbing lever 41 in a plane orthogonal to the axis of the pair of mirror seat hinges 16x (i.e., in the horizontal direction when the camera 10 is held horizontal) by the engagement of the guide pins 14d and 14e with the guide holes 43a and 43b, respectively. The mirror-up shock-absorbing lever 43 is provided on a side thereof with a spring contact portion 43c. The mirror-up shock-absorbing lever 43 is provided with a shock-absorbing pin (pressure receiving portion) D2 which projects toward the inside of the mirror box 14. The shock-absorbing pin D2 projects inside the mirror box 14 through a through-hole 14f formed through the mirror box 14 (see FIGS. 2 and 3). The through-hole 14f is formed so that the size thereof does not interfere with positional variations of the shock-absorbing pin D2 that occur in association with movement of the mirror-up shock-absorbing lever 43.

The mirror-down shock-absorbing lever 41 and the mirror-up shock-absorbing lever 43 receive the biasing force of a common spring, namely, the shock-absorbing spring 44. The shock-absorbing spring 44 is a torsion spring which is provided with a coil portion 44a, a first spring arm portion 44b and a second spring arm portion 44c. The coil portion 44a surrounds a columnar-shaped spring support projection 14g which is formed on a side of the mirror box 14, the first spring arm portion 44b extends from the coil portion 44a and is engaged with the spring hook 41c of the mirror-down shock-absorbing lever 41, and the second spring arm portion 44c extends from the coil portion 44a and is in contact with the spring contact portion 43c of the mirror-up shock-absorbing lever 43. The second spring arm portion 44c has a V-shaped portion that is angled at a middle part of the second spring arm portion 44c, and this V-shaped portion abuts against the spring contact portion 43c. In the assembled state shown in FIGS. 9 through 16, the shock-absorbing spring 44 is deformed so that the shock-absorbing spring 44 exerts its deformation restoring force on the mirror-down shock-absorbing lever 41 and the mirror-up shock-absorbing lever 43. The first spring arm portion 44b of the shock-absorbing spring 44 presses the spring hook 41c to bias the mirror-down shock-absorbing lever 41 upward with respect to FIGS. 9 through 13 and 15 through 17. The mirror-down shock-absorbing lever 41 is prevented from further moving in this biasing direction by the engagement of the lower ends of the upper guide hole 41a and the lower guide hole 41b with the upper pin 14a and the lower pin 14b, respectively. The limit of movement of the mirror-down shock-absorbing lever 41 in this biasing direction corresponds to a shock-absorbing stand-by position of the mirror-down shock-absorbing lever 41. In addition, the shock-absorbing spring 44 biases the mirror-up shock-absorbing lever 43 leftward with respect to FIGS. 9 through 16 by pressing the spring contact portion 43c by the deformation restoring force of the shock-absorbing spring 44 via the second spring arm portion 44c. The mirror-up shock-absorbing lever 43 is prevented from moving in this biasing direction by the engagement of one ends of the two guide holes 43a and 43b with the upper guide pin 14d and the lower guide pin 14e, respectively. The limit of movement of the mirror-up shock-absorbing lever 43 in this biasing direction corresponds to a shock-absorbing stand-by position of the mirror-up shock-absorbing lever 43.

The mirror seat 16 is provided, on a side thereof in the vicinity of the free end of the mirror seat 16, with a shock-absorbing contact portion (mirror-side contact portion) 16c. The shock-absorbing contact portion 16c is formed to project in a direction to approach the side wall of the mirror box 14 in which the through-holes 14c and 14f are formed. In a state where the mirror-down shock-absorbing lever 41 and the mirror-up shock-absorbing lever 43 are held in the respective shock-absorbing stand-by positions thereof, the shock-absorbing pins D1 and D2, which respectively project inside the mirror box 14 through the through-holes 14c and 14f, are positioned in a moving path of the shock-absorbing contact portion 16c when the movable mirror 15 rotates between the mirror-down position and the mirror-up position to be contactable with the shock-absorbing contact portion 16c. More specifically, the shock-absorbing pin D1 is held at a position slightly spaced from the shock-absorbing contact portion 16c (i.e., a position in the close vicinity of the shock-absorbing contact portion 16c) when the movable mirror 15 is in the mirror-down position, while the shock-absorbing pin D2 is held at a position slightly spaced from the shock-absorbing contact portion 16c (i.e., a position in the close vicinity of the shock-absorbing contact portion 16c) when the movable mirror 15 is in the mirror-up position. The shock-absorbing pins D1 and D2 and the shock-absorbing contact portion 16c are formed into columnar projections having substantially the same diameter, each of which has the shape of a regular circle in cross section. When the movable mirror 15 rotates between the mirror-down position and the mirror-up position, the shock-absorbing contact portion 16c passes through the installation positions of the shock-absorbing pins D1 and D2 while making the outer peripheral surface of the shock-absorbing contact portion 16c slide on the shock-absorbing pins D1 and D2. At this stage, the mirror-down shock-absorbing lever 41 and the mirror-up shock-absorbing lever 43 are pressed in a direction against the biasing force of the shock-absorbing spring 44 from the shock-absorbing stand-by positions.

The mirror-down position of the movable mirror 15 can be adjusted by adjusting the position of the mirror-down position defining pin 20 relative to the mirror box 14, and the position of the shock-absorbing contact portion 16c changes by making an adjustment to the movable mirror 15. The adjustment member 42, which is fitted into the fitting hole 41d of the mirror-down shock-absorbing lever 41, constitutes a position adjusting mechanism with which the position of the shock-absorbing pin D1 can be adjusted to correspond to variations in position of the shock-absorbing contact portion 16c.

FIGS. 19 through 23 each conceptually show the position of the shock-absorbing contact portion 16c of the mirror seat 16 when the movable mirror 15 is in the mirror-down position. As described above, the adjustment member 42 that is provided with the shock-absorbing pin D1 can be attached to and detached from the mirror-down shock-absorbing lever 41 at the angular position shown in FIG. 19. Even when the adjustment member 42 is in the position rotated by 180 degrees from the position shown in FIG. 19, the pair of lugs 42c of the adjustment member 42 can be made to pass through the pair of cutouts 41f of the mirror-down shock-absorbing lever 41; however, since the shock-absorbing pin D1 is positioned too close to the moving path of the shock-absorbing contact portion 16c, such a position of the adjustment member 42 (the position rotated by 180 degrees from the position shown in FIG. 19) is inappropriate as an angular position of the adjustment member 42 at which the adjustment member 42 is to be attached to the mirror-down shock-absorbing lever 41 when the movable mirror 15 is in the vicinity of the mirror-down position. When an adjustment is made to the mirror-down position of the movable mirror 15 by moving the mirror-down position defining pin 20, the adjustment member 42 is rotated to the angular position shown in FIG. 20, where the shock-absorbing pin D1 is spaced from the shock-absorbing contact portion 16c. When the adjustment member 42 is in this angular position shown in FIG. 20, even if the mirror-down position of the movable mirror 15 is slightly changed, the shock-absorbing contact portion 16c does not come into contact with the shock-absorbing pin D1, thus not interfering with the positioning of the movable mirror 15 that is achieved by the engagement between the stopper 16a and the mirror-down position defining pin 20.

Figure 21:
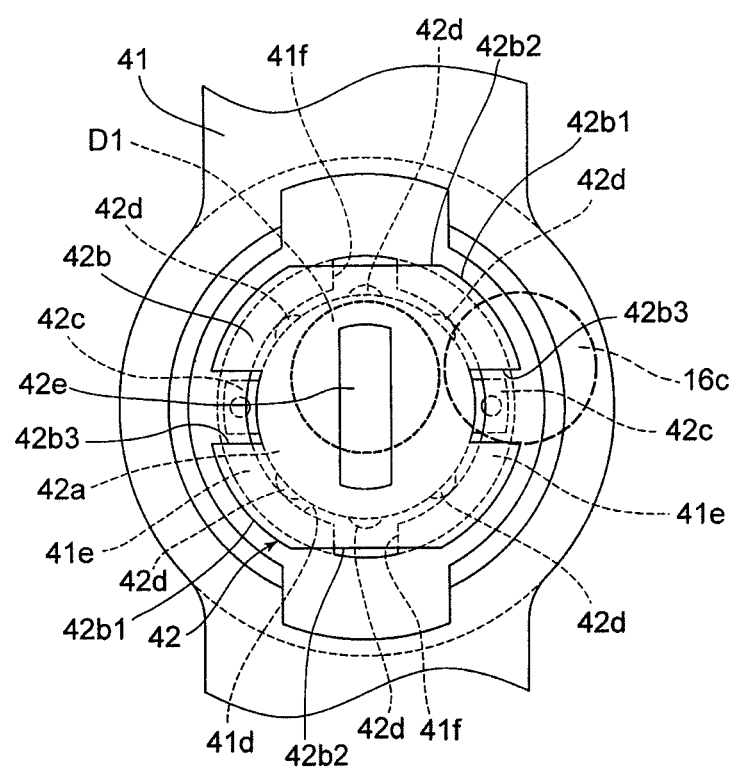
FIG. 21 is a diagram showing the mirror-down shock-absorbing lever and the adjustment member in a state where the shock-absorbing pin of the mirror-down shock-absorbing lever is positioned at an optimum position with respect to a shock-absorbing contact portion of the movable mirror.
Figure 22:
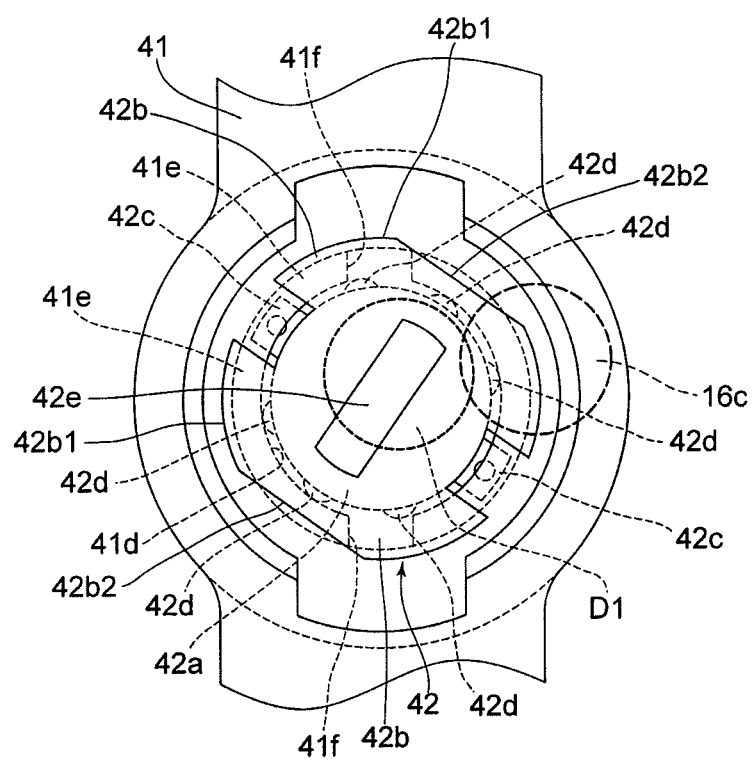
FIG. 22 is a diagram showing a state where the adjustment member has been rotated clockwise from the angular position shown in FIG. 21.
Figure 23:
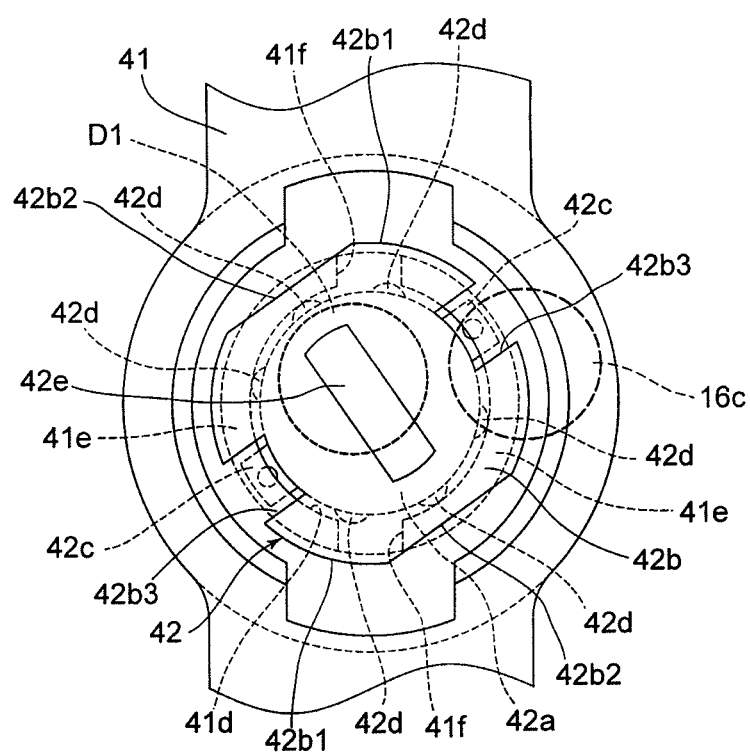
FIG. 23 is a diagram showing a state where the adjustment member has been rotated counterclockwise from the angular position shown in FIG. 21.

The position of the shock-absorbing pin D1 relative to the shock-absorbing contact portion 16c is adjusted by rotating the adjustment member 42 with the mirror-down position of the movable mirror 15 having been determined. FIG. 21 shows the position of the adjustment member 42 in a state where the position of the shock-absorbing pin D1 has been optimized with respect to the shock-absorbing contact portion 16c when the movable mirror 15 is in the mirror-down position. In the state shown in FIG. 21, the shock-absorbing pin D1 is positioned to be slightly spaced leftward from the shock-absorbing contact portion 16c and to deviate slightly downward from the shock-absorbing contact portion 16c in the vertical direction. The reason why this position of the shock-absorbing pin D1 is optimum will be discussed later. Rotating the adjustment member 42 clockwise from the position shown in FIG. 21 to the position shown in FIG. 22 causes the shock-absorbing pin D1 to be displaced in a direction to approach the shock-absorbing contact portion 16c, and rotating the adjustment member 42 counterclockwise from the position shown in FIG. 21 to the position shown in FIG. 23 causes the shock-absorbing pin D1 to be displaced in a direction to move away from the shock-absorbing contact portion 16c. In the case where the position of the shock-absorbing contact portion 16c changes from the position shown in FIGS. 19 through 23, the position of the shock-absorbing pin D1 is optimized by making an adjustment to the angular position of the adjustment member 42 as shown in FIG. 22 or 23.

Operations of the mirror shock-absorbing mechanism 40 will be hereinafter discussed with reference to FIGS. 10 through 20. In the following descriptions about operations of the mirror shock-absorbing mechanism 40, it is assumed that both adjustment of the mirror-down position of the movable mirror 15 that is carried out by adjusting the position of the mirror-down position defining pin 20 and adjustment of the position of the shock-absorbing pin D1 that is carried out by rotating the adjustment member 42 have completed. In addition, in the following descriptions, only the mirror-down shock-absorbing lever 41 will be referred to in order to represent the combination of the mirror-down shock-absorbing lever 41 and the adjustment member 42.

Figure 10:
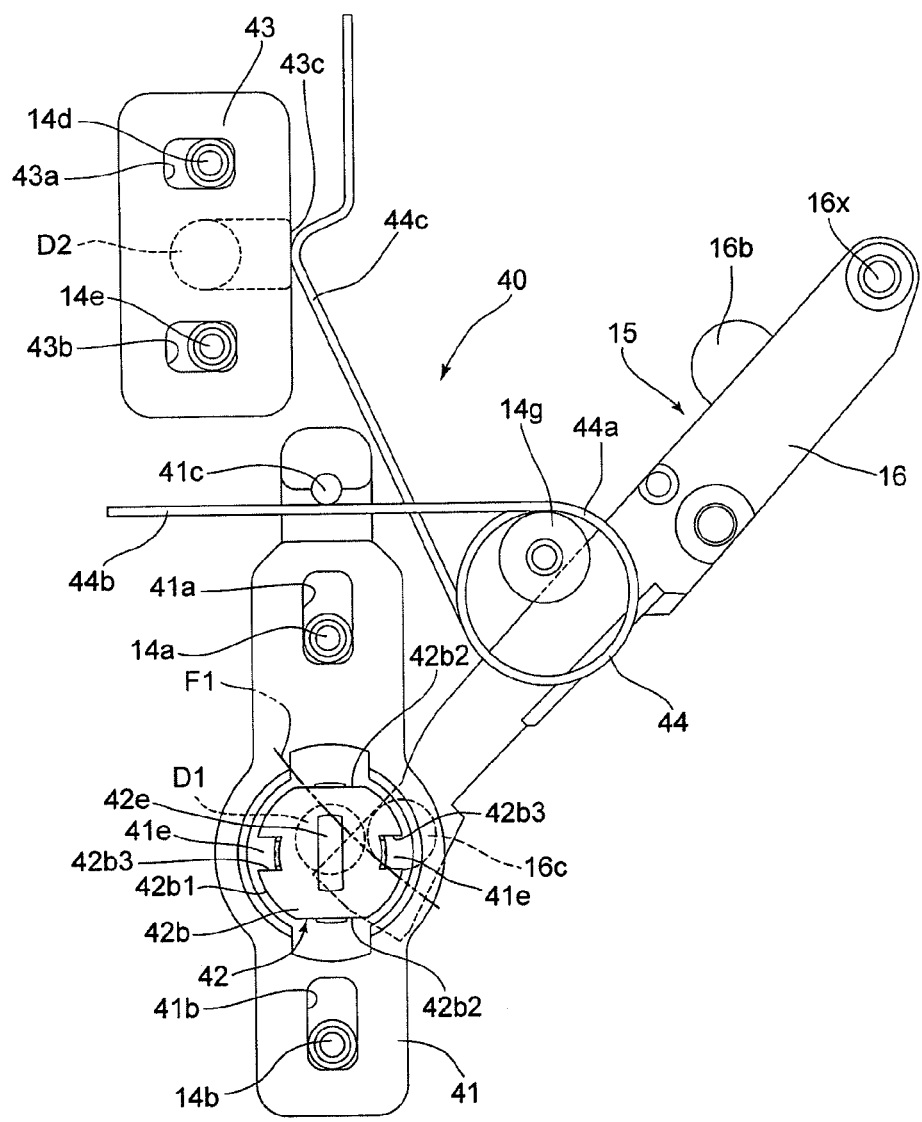
FIG. 10 is a side elevational view of the mirror shock-absorbing mechanism in the mirror-down state.

FIG. 10 shows a state where the movable mirror 15 is in the mirror-down position. In this state, the movable mirror 15 is held in the mirror-down position with the mirror seat boss 16b pressed downward by the mirror drive lever 34, which serves as a component of the mirror drive mechanism 30, to make the stopper 16a of the mirror seat 16 abut against the mirror-down position defining pin 20 (see FIG. 1). The mirror-down shock-absorbing lever 41 and the mirror-up shock-absorbing lever 43 are held at the respective shock-absorbing stand-by positions thereof by the biasing force of the shock-absorbing spring 44. The shock-absorbing pin D1, which is provided on the mirror-down shock-absorbing lever 41, is held to be slightly spaced from the shock-absorbing contact portion 16c of the mirror seat 16, thus not interfering with the positioning of the mirror seat 16 that is achieved by the engagement between the stopper 16a and the mirror-down position defining pin 20.

In FIGS. 10, 15, 16, 17, 19 and 20, a moving path F1 of a radially outer edge of the shock-absorbing contact portion 16c of the mirror seat 16 (an area of the outer periphery of the shock-absorbing contact portion 16c which is farthest from the axis of the pair of mirror seat hinges 16x) which extends along the rotational direction of the movable mirror 15 is shown. FIGS. 10, 17, 19 and 20 show the position of the shock-absorbing contact portion 16c in a state where the movable mirror 15 has reached the mirror-down position, which is one of the two rotational limits of the movable mirror 15. The shock-absorbing contact portion 16c does not further move in a mirror-down direction (downwards in an obliquely rightward direction with respect to FIGS. 10, 17, 19 and 20) beyond the position shown in FIGS. 10, 17, 19 and 20, so that the moving path F1 shown in each of the drawings includes a section that the shock-absorbing contact portion 16c does not actually trace.

Figure 17:
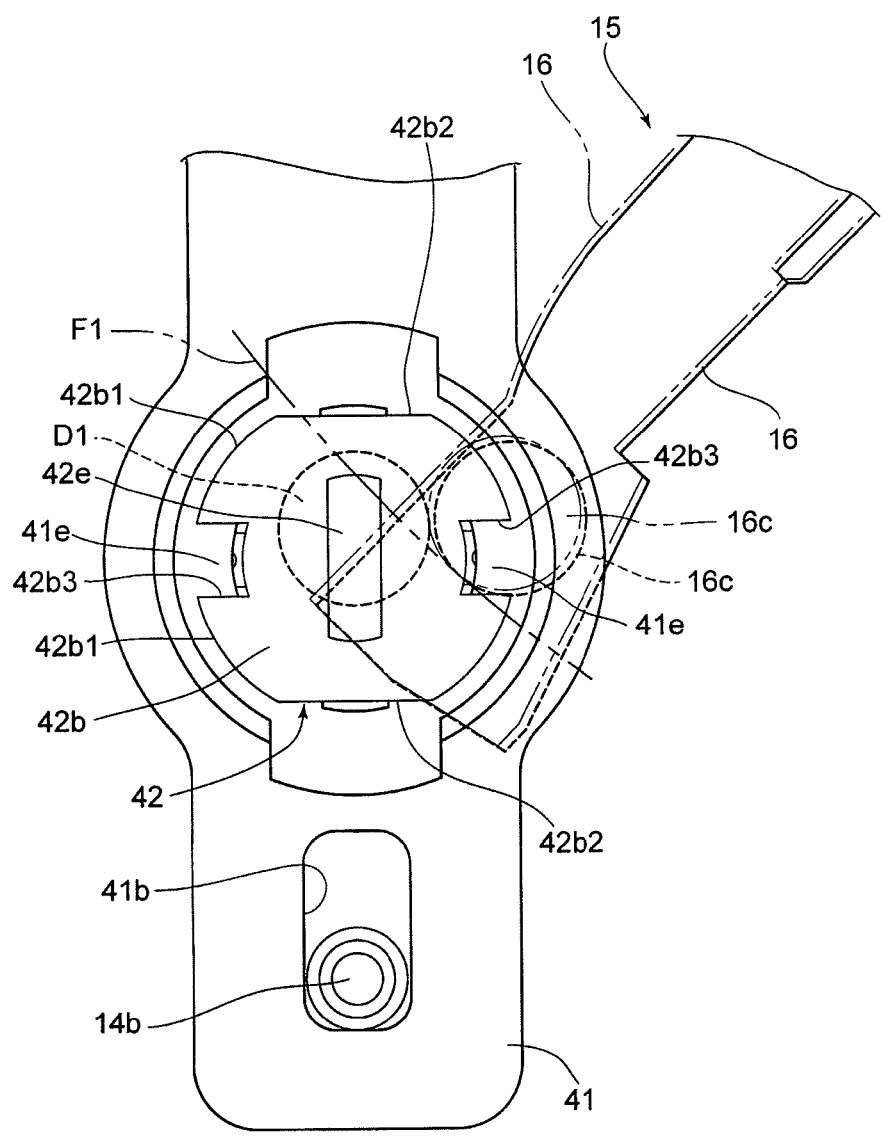
FIG. 17 is an enlarged view of a portion of the mirror shock-absorbing mechanism, showing a manner of suppressing bounce of the movable mirror by the mirror-down shock-absorbing lever when the movable mirror reaches the mirror-down position.

In a state where the mirror-down shock-absorbing lever 41 is held in the shock-absorbing stand-by position as shown in FIGS. 10 and 17, part of the shock-absorbing pin D1 has moved into the inner side of the moving path F1 (the side of the moving path F1 which is closer to the axis of the pair of mirror seat hinges 16x) and is positioned therein. Therefore, when the movable mirror 15 is rotated from the mirror-down position toward the mirror-up position by the mirror drive lever 34 of the mirror drive mechanism 30, at an initial stage of this rotation the shock-absorbing contact portion 16c of the mirror seat 16 comes into contact with the shock-absorbing pin D1. Thereupon, the shock-absorbing contact portion 16c exerts a component of force on the shock-absorbing pin D1 in a direction to press the mirror-down shock-absorbing lever 41 while causing outer peripheral surfaces of the shock-absorbing contact portion 16c and the shock-absorbing pin D1 to slide on each other to thereby move the mirror-down shock-absorbing lever slightly downward from the shock-absorbing stand-by position shown in FIG. 10 against the biasing force of the shock-absorbing spring 44. The magnitude of the load on the movable mirror 15 from the mirror-down shock-absorbing lever 41 at this time is set at a level so as not to interfere with the driving of the movable mirror 15 toward the mirror-up position, via the mirror drive mechanism 30. In addition, since the shock-absorbing contact portion 16c and the shock-absorbing pin D1, each of which is columnar in shape, are made to slide on each other, there is no possibility of the shock-absorbing contact portion 16c and the shock-absorbing pin D1 snagging each other. Upon the movable mirror 15 further rotating toward the mirror-up position beyond the position shown in FIG. 15 where the shock-absorbing contact portion 16c rides over the shock-absorbing pin D1, the pressed state of the shock-absorbing pin D1 that is pressed by the shock-absorbing contact portion 16c is released, which causes the mirror-down shock-absorbing lever 41 to return to the shock-absorbing stand-by position by the biasing force of the shock-absorbing spring 44.

When the movable mirror 15 rotates toward the mirror-up position from the state shown in FIG. 10, if the shock-absorbing contact portion 16c exerts a component of force in a direction to lift the mirror-down shock-absorbing lever 41 on the shock-absorbing pin D1, there is a possibility of the mirror-down shock-absorbing lever 41, which is prevented from moving upward beyond the shock-absorbing stand-by position, functioning as a stopper to thereby prevent the movable mirror from rotating. Accordingly, the position of the shock-absorbing pin D1 relative to the shock-absorbing contact portion 16c is set so as not to cause interference with rotation of the movable mirror 15 in the mirror-up direction. More specifically, since the shock-absorbing contact portion 16c and the shock-absorbing pin D1 are columnar in shape having substantially the same diameter, a force to press the mirror-down shock-absorbing lever 41 can be exerted on the mirror-down shock-absorbing lever 41 by making the shock-absorbing contact portion 16c abut against an upper half of the shock-absorbing pin D1 (upper half of the vertically-divided two halves of the shock-absorbing pin D1 with respect to FIG. 10). The above described adjusting operation to adjust the position of the shock-absorbing pin D1 is performed while paying attention to this point.

Figure 11:
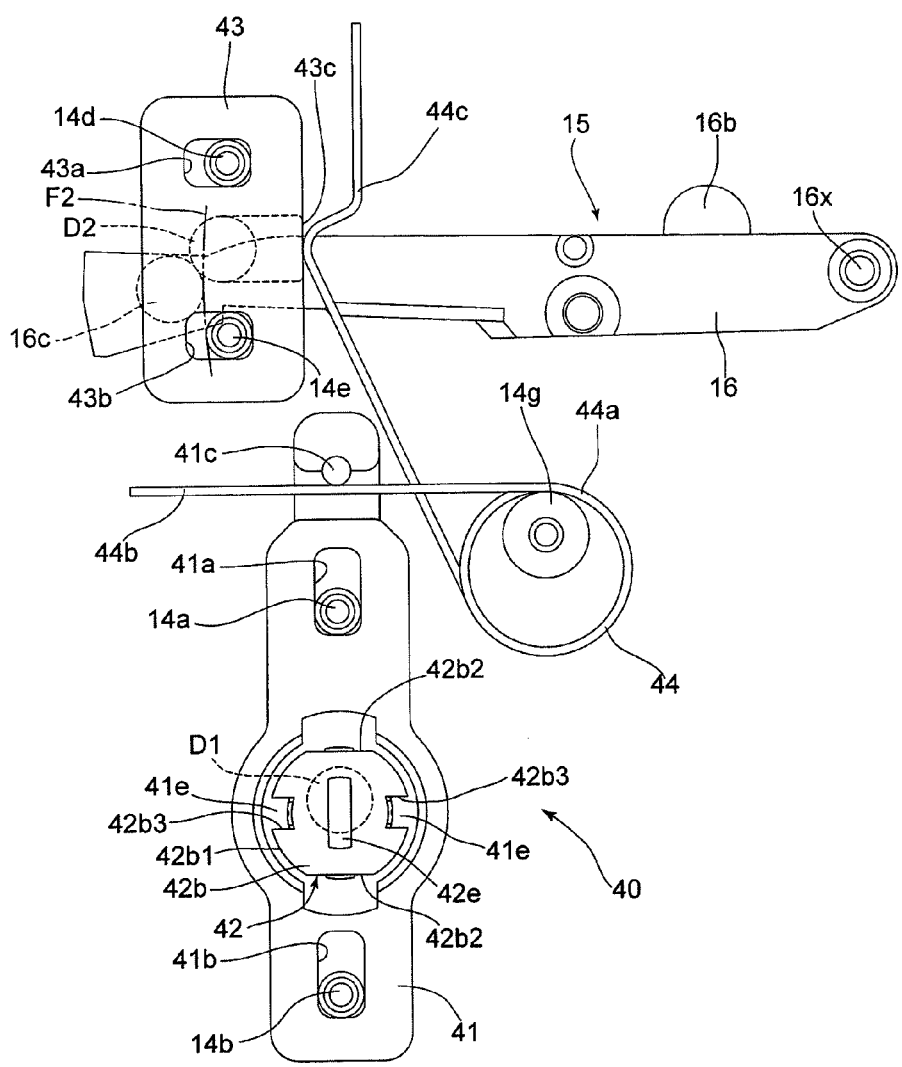
FIG. 11 is a side elevational view of the mirror shock-absorbing mechanism in a state where the movable mirror is in the process of rotating to the mirror-up position from the mirror-down position.
Figure 13:
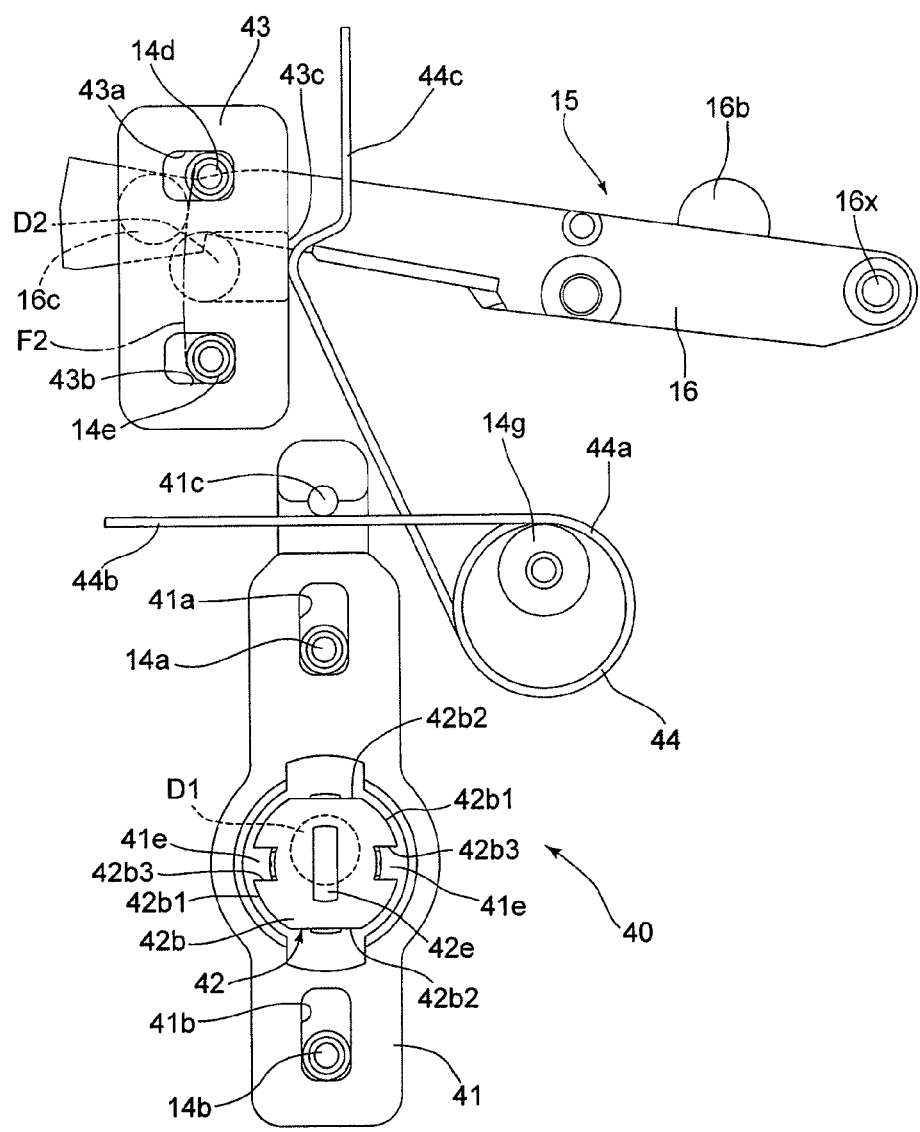
FIG. 13 is a side elevational view of the mirror shock-absorbing mechanism in the mirror-up state.
Figure 14:
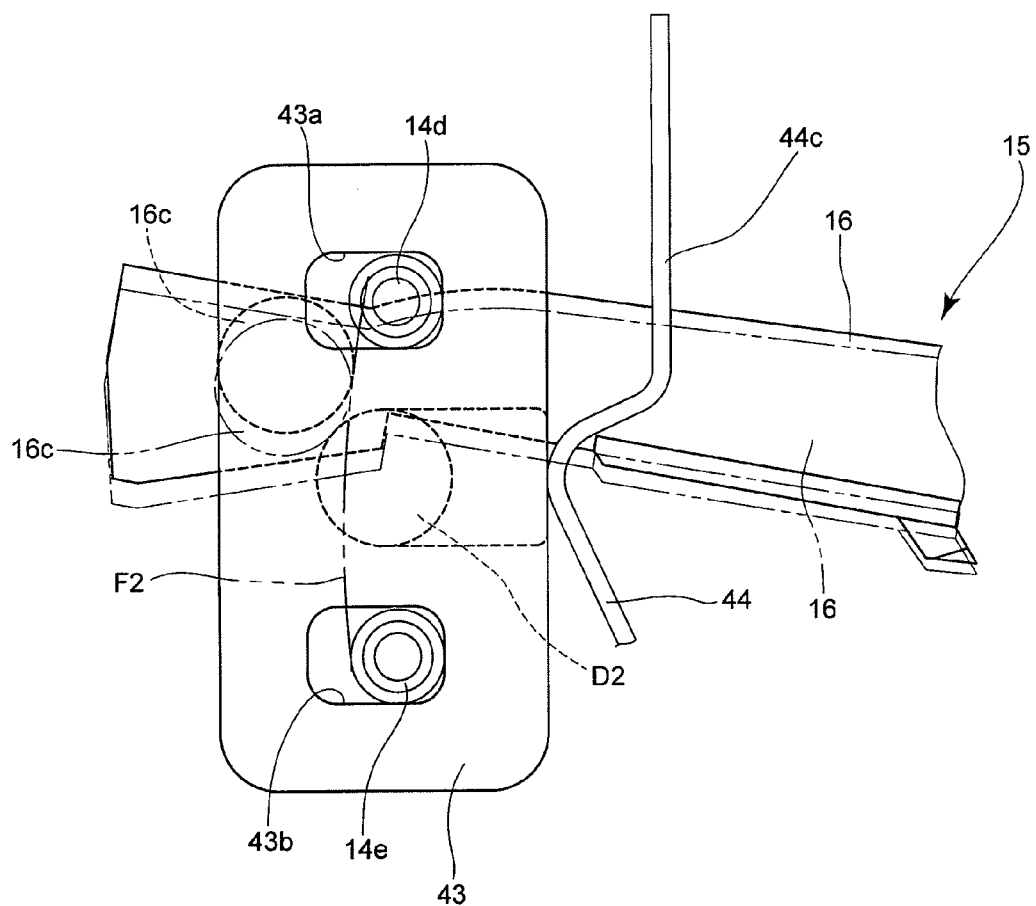
FIG. 14 is an enlarged view of a portion of the mirror shock-absorbing mechanism, showing a manner of suppressing bounce of the movable mirror by the mirror-up shock-absorbing lever when the movable mirror reaches the mirror-up position.

When the movable mirror 15 approaches the mirror-up position, the shock-absorbing contact portion 16c of the mirror seat 16 comes into contact with the shock-absorbing pin D2 of the mirror-up shock-absorbing lever 43 as shown in FIG. 11. More specifically, in FIGS. 11 through 14, a moving path F2 of a radially inner edge of the shock-absorbing contact portion 16c of the mirror seat 16 (an area of the outer periphery of the shock-absorbing contact portion 16c which is closest to the axis of the pair of mirror seat hinges 16x) which extends along the rotational direction of the movable mirror 15 is shown. Since part of the shock-absorbing pin D2 has moved into the outer side of the moving path F2 (the side of the moving path F2 which is farther from the axis of the pair of mirror seat hinges 16x) and is positioned therein, the shock-absorbing contact portion 16c of the movable mirror 15, which is in the process of rotating toward the mirror-up position, comes into contact with the shock-absorbing pin D2. FIGS. 13 and 14 show the position of the shock-absorbing contact portion 16c in a state where the movable mirror 15 has reached the mirror-up position, which is one rotational limit of the movable mirror 15. The shock-absorbing contact portion 16c does not further move in a mirror-up direction (the upward direction with respect to FIGS. 13 and 14) beyond the position thereof shown in FIGS. 13 and 14, so that the moving path F2 shown in each of the drawings includes a section that the shock-absorbing contact portion 16c does not actually trace.

Figure 12:
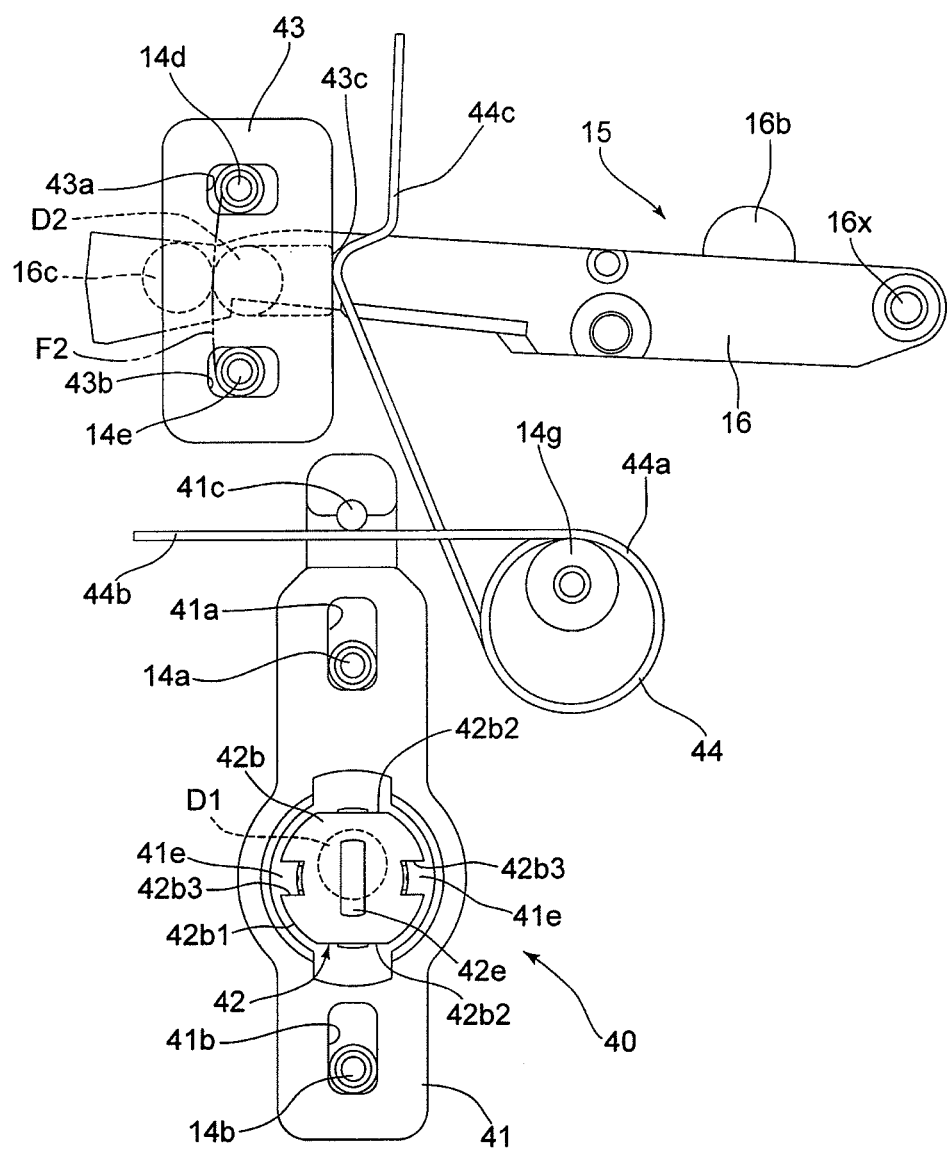
FIG. 12 is a side elevational view of the mirror shock-absorbing mechanism in a state where the movable mirror is in the process of rotating to the mirror-up position from the mirror-down position.

At the stage shown in FIG. 11, the movable mirror 15 has not yet reached the mirror-up position, and a further rotation of the movable mirror 15 toward the mirror-up position causes the shock-absorbing contact portion 16c of the mirror seat 16 to push the mirror-up shock-absorbing lever 43 rightward from the shock-absorbing stand-by position against the biasing force of the shock-absorbing spring 44 while sliding on an outer periphery of the shock-absorbing pin D2 as shown in FIG. 12. During the time the mirror-up shock-absorbing lever 43 is pushed rightward from the shock-absorbing stand-by position, the load of the shock-absorbing spring 44 is exerted on rotation of the movable mirror 15, while the movable mirror 15 rotates while being shock-absorbed by the mirror-up shock-absorbing lever 43 and the shock-absorbing spring 44. Upon the movable mirror 15 further rotating toward the mirror-up position beyond the position where the shock-absorbing contact portion 16c rides over the shock-absorbing pin D2, the pressed state of the shock-absorbing pin D2 that is pressed by the shock-absorbing contact portion 16c is released, which causes the mirror-up shock-absorbing lever 43 to return to the shock-absorbing stand-by position by the biasing force of the shock-absorbing spring 44.

If the positional relationship between the shock-absorbing pin D2 and the shock-absorbing contact portion 16c is such that the axis of the shock-absorbing pin D2 of the mirror-up shock-absorbing lever 43 is positioned on the moving path of the axis of the shock-absorbing contact portion 16c of the mirror seat 16 (the positional relationship is such that the shock-absorbing pin D2 has been moved leftward from the position shown in FIG. 11), when the shock-absorbing contact portion 16c and the shock-absorbing pin D2 are brought into contact with each other, there is a possibility of the mirror-up shock-absorbing lever 43 not moving and therefore functioning as a stopper, thus preventing the movable mirror 15 from rotating. Accordingly, the shock-absorbing contact portion 16c and the shock-absorbing pin D2 are arranged to be offset from each other in a radial direction of rotation of the movable mirror 15 so that a component of force which securely moves the mirror-up shock-absorbing lever 43 is generated when the shock-absorbing contact portion 16c and the shock-absorbing pin D2 come into contact with each other. In the present embodiment, when the shock-absorbing contact portion 16c presses the shock-absorbing pin D2, with the mirror-up shock-absorbing lever 43 biased to move in a direction away from the axis of the pair of mirror seat hinges 16x (leftward with respect to FIGS. 9 through 16) and held in the shock-absorbing stand-by position, the shock-absorbing pin D2 offsets toward the side closer to the axis of the pair of mirror seat hinges 16x than the shock-absorbing contact portion 16c so as to apply a component of force on the shock-absorbing pin D2 which moves the mirror-up shock-absorbing lever 43 in a direction to approach the axis of the pair of mirror seat hinges 16x (rightward with respect to FIGS. 10 through 16).

Conversely, in an alternative embodiment, it is possible for the shock-absorbing pin D2 to offset toward the side farther from the axis of the pair of mirror seat hinges 16x than the shock-absorbing contact portion 16c so as to apply a component of force on the shock-absorbing pin D2 which moves the mirror-up shock-absorbing lever 43 in a direction away from the axis of the pair of mirror seat hinges 16x (leftward with respect to FIGS. 9 through 16) when the shock-absorbing contact portion 16c presses the shock-absorbing pin D2. However, in such a case, the biasing direction of the mirror-up shock-absorbing lever 43 is opposite to that of the illustrated embodiment, which makes it impossible to bias the mirror-up shock-absorbing lever 43 by the shock-absorbing spring 44 that biases the mirror-down shock-absorbing lever 41, so that an additional biaser would be required for biasing the mirror-up shock-absorbing lever 43.

When the movable mirror 15 is rotated to the mirror-up position that is shown in FIGS. 13 and 14, an upper surface of the mirror seat 16 comes into contact with the upper stopper 21, so that the movable mirror 15 is prevented from further rotating upward (see FIG. 1). In this mirror-up state, the shock-absorbing contact portion 16c is spaced from the shock-absorbing pin D2, and both the mirror-down shock-absorbing lever 41 and the mirror-up shock-absorbing lever 43 are held in the respective shock-absorbing stand-by positions thereof by the biasing force of the shock-absorbing spring 44. In this state, if the movable mirror 15 which has reached the mirror-up position behaves (bounces) in such a manner as to move back toward the mirror-down position, the shock-absorbing contact portion 16c comes into contact with the shock-absorbing pin D2 of the mirror-up shock-absorbing lever 43 which has returned to the shock-absorbing stand-by position. In order for the movable mirror 15 which has bounced in such a manner to further rotate toward the mirror-down position, it is required to press and move the mirror-up shock-absorbing lever 43 against the biasing force of the shock-absorbing spring 44; however, unlike the movement of the movable mirror 15 caused by the driving force of the mirror drive mechanism 30, the bouncing of the movable mirror 15 caused by the inertia of the movable mirror 15 upon reaching the mirror-up position, a force strong enough to move the mirror-up shock-absorbing lever 43 that is biased by the shock-absorbing spring 44 is not exerted on the mirror-up shock-absorbing lever 43, so that the mirror-up shock-absorbing lever 43 in effect serves as a stopper for preventing the movable mirror 15 from bouncing to thereby limit the range of bouncing to the narrow range shown and defined by slide lines (dotted lines) and two-dot chain lines in FIG. 14.

As described above, when the movable mirror 15 rotates to the mirror-up position from the mirror-down position, the shock-absorbing contact portion 16c of the mirror seat 16 comes into contact with the shock-absorbing pin D2 of the mirror-up shock-absorbing lever 43 and causes the load of the shock-absorbing spring 44 to be exerted on the movable mirror 15 to absorb shock of the movable mirror 15 while pressing and moving the mirror-up shock-absorbing lever 43 from the shock-absorbing stand-by position. Subsequently, the bounce of the movable mirror 15 after it reaches the mirror-up position is suppressed by the mirror-up shock-absorbing lever 43 which has returned to the shock-absorbing stand-by position. Accordingly, the movable mirror 15 can be stabilized securely and stably at the mirror-up position by the mirror-up shock-absorbing lever 43, which is an independent shock-absorbing member.

Contrary to the above described operations to move the movable mirror 15 to the mirror-up position, when the movable mirror 15 is rotated toward the mirror-down position from the mirror-up position that is shown in FIG. 13 by the mirror drive lever 34 of the mirror drive mechanism 30, at an initial stage of this rotation of the movable mirror 15, the shock-absorbing contact portion 16c comes into contact with the shock-absorbing pin D2 of the mirror-up shock-absorbing lever 43 (as shown by the two-dot chain lines in FIG. 14). Subsequently, the movable mirror 15 continues to rotate toward the mirror-down position without stopping at the position shown by the two-dot chain lines in FIG. 14 because the mirror drive mechanism 30 exerts a driving force in the direction toward the mirror-down direction on the movable mirror 15, unlike at the above described occurrence of bounce of the movable mirror 15 after the movable mirror 15 reaches the mirror-up position. Thereupon, the shock-absorbing contact portion 16c exerts a component of force on the shock-absorbing pin D2 which presses the mirror-up shock-absorbing lever 43 rightward with respect to FIG. 14 while making outer peripheral surfaces of the shock-absorbing contact portion 16c and the shock-absorbing pin D2 slide on each other to thereby move the mirror-up shock-absorbing lever 43 rightward from the shock-absorbing stand-by position shown in FIGS. 13 and 14 against the biasing force of the shock-absorbing spring 44. Upon the movable mirror 15 further rotating toward the mirror-down position beyond the position shown in FIG. 12, where the shock-absorbing contact portion 16c rides over the shock-absorbing pin D2, the pressed state of the shock-absorbing pin D2 that is pressed by the shock-absorbing contact portion 16c is released, which causes the mirror-up shock-absorbing lever 43 to return to the shock-absorbing stand-by position by the biasing force of the shock-absorbing spring 44.

Figure 15:
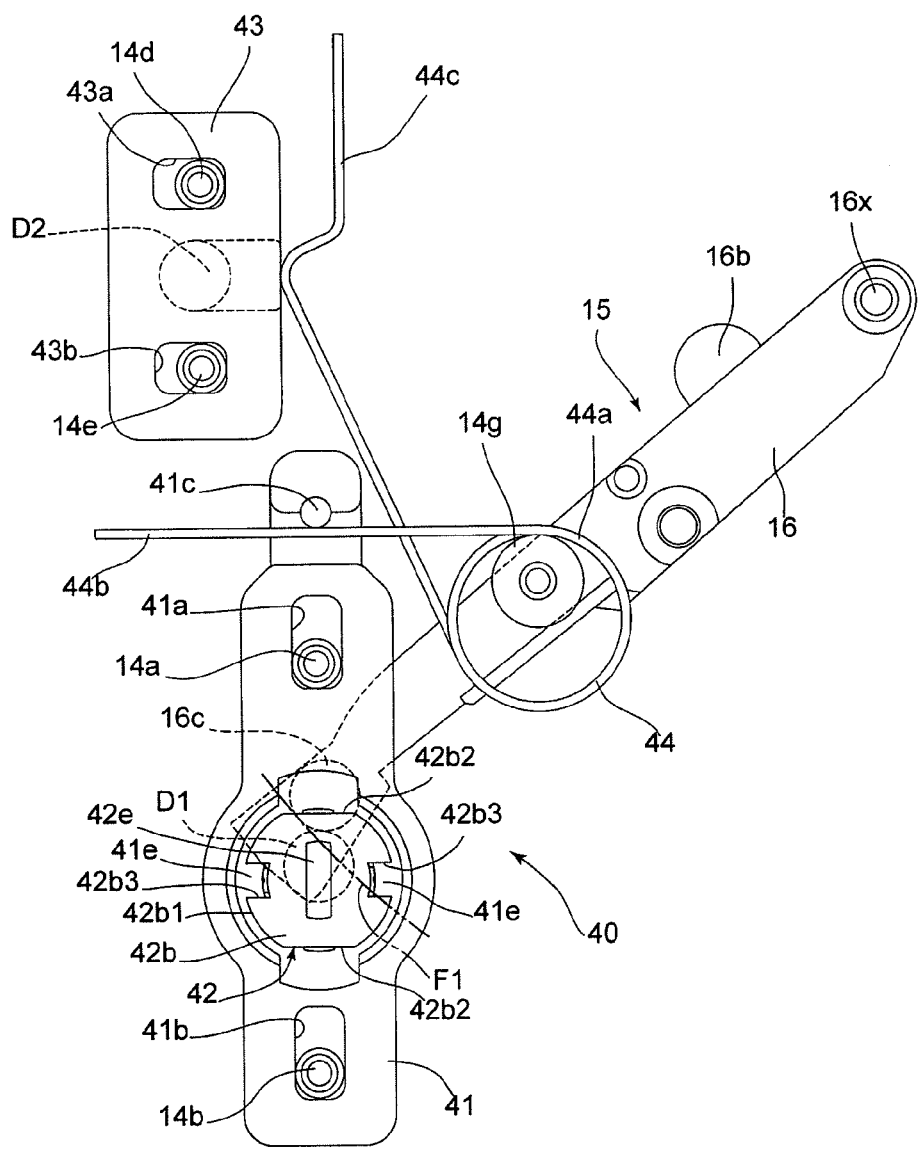
FIG. 15 is a side elevational view of the mirror shock-absorbing mechanism in a state where the movable mirror is in the process of rotating to the mirror-down position from the mirror-up position.
Figure 16:
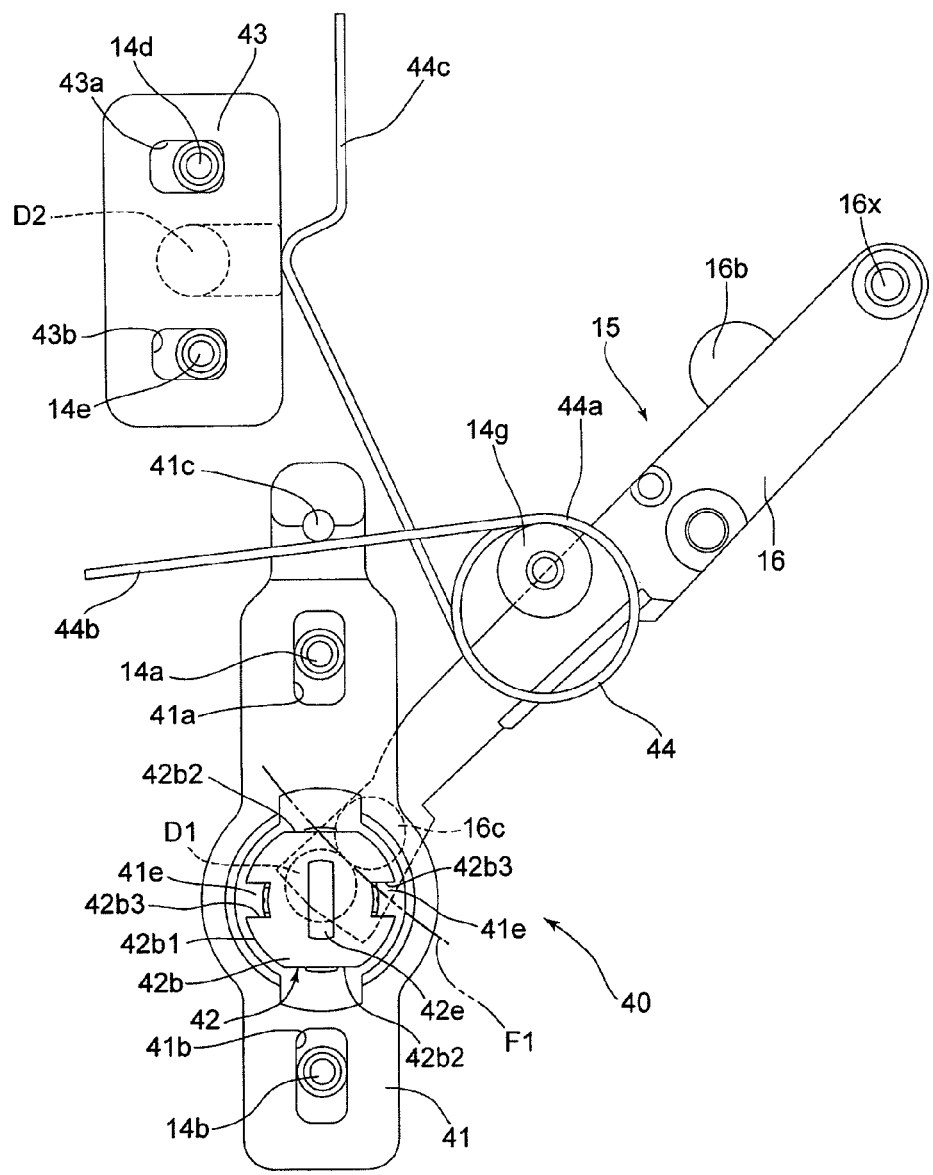
FIG. 16 is a side elevational view of the mirror shock-absorbing mechanism in a state where the movable mirror is in the process of rotating to the mirror-down position from the mirror-up position.

When the movable mirror 15 approaches the mirror-down position, the shock-absorbing contact portion 16c of the mirror seat 16 comes into contact with the shock-absorbing pin D1 of the mirror-down shock-absorbing lever 41 (adjustment member 42) as shown in FIG. 15. Since part of the shock-absorbing pin D1 has moved into and positioned in the inner side of the moving path F1 (one side of the moving path F1 which is closer to the axis of the pair of mirror seat hinges 16x) of a radially outer edge of the shock-absorbing contact portion 16c in the vicinity of the mirror-down position when the mirror-down shock-absorbing lever 41 is in the shock-absorbing stand-by position as described above, the shock-absorbing contact portion 16c of the movable mirror 15 which is in the process of rotating toward the mirror-down position comes into contact with the shock-absorbing pin D1. At the stage shown in FIG. 15, the movable mirror 15 has not yet reached the mirror-down position, and a further rotation of the movable mirror 15 toward the mirror-down position causes the shock-absorbing contact portion 16c of the mirror seat 16 to push the mirror-down shock-absorbing lever 41 downward from the shock-absorbing stand-by position against the biasing force of the shock-absorbing spring 44 while sliding on an outer periphery of the shock-absorbing pin D1, as shown in FIG. 16. During the time the mirror-down shock-absorbing lever 41 is pushed downward from the shock-absorbing stand-by position, the load of the shock-absorbing spring 44 is exerted on the rotation of the movable mirror 15, while the movable mirror 15 rotates while being shock-absorbed by the mirror-down shock-absorbing lever 41 and the shock-absorbing spring 44. Upon the movable mirror 15 further rotating toward the mirror-down position beyond the position where the shock-absorbing contact portion 16c rides over the shock-absorbing pin D1, the pressed state of the shock-absorbing pin D1 that is pressed by the shock-absorbing contact portion 16c is released, which causes the mirror-down shock-absorbing lever 41 to return to the shock-absorbing stand-by position by the biasing force of the shock-absorbing spring 44.

Similar to the positional relationship between the mirror-up shock-absorbing lever 43 and the movable mirror 15 during the mirror-up movement, if the positional relationship between the shock-absorbing pin D1 and the shock-absorbing contact portion 16c is such that the axis of the shock-absorbing pin D1 of the mirror-down shock-absorbing lever 41 (adjustment member 42) is positioned on the moving path of the axis of the shock-absorbing contact portion 16c of the mirror seat 16 (the positional relationship is such that the shock-absorbing pin D1 has been moved obliquely left downward from the position shown in FIG. 15), when the shock-absorbing contact portion 16c and the shock-absorbing pin D1 are brought into contact with each other, there is a possibility of the mirror-down shock-absorbing lever 41 not moving and therefore functioning as a stopper, thus preventing the movable mirror 15 from rotating. Accordingly, the shock-absorbing contact portion 16c and the shock-absorbing pin D1 are arranged to be offset from each other in a radial direction of rotation of the movable mirror 15 so that a component of force which securely moves the mirror-down shock-absorbing lever 41 is generated when the shock-absorbing contact portion 16c and the shock-absorbing pin D1 come into contact with each other. In the present embodiment, the shock-absorbing pin D1 is positioned to be offset toward the side farther from the axis of the pair of mirror seat hinges 16x than the shock-absorbing contact portion 16c so that the mirror-down shock-absorbing lever 41 moves in a direction (downward direction) obliquely intersecting the moving path F1 of the shock-absorbing contact portion 16c when the shock-absorbing contact portion 16c presses the shock-absorbing pin D1.

The moving direction of the mirror-down shock-absorbing lever 41 is not limited solely to this particular moving direction. For instance, the mirror-down shock-absorbing lever 41 can be made to move in along a radius of rotation of the movable mirror 15 like the mirror-up shock-absorbing lever 43. In this case, the mirror-down shock-absorbing lever 41 can be biased in a direction either to approach or move away from the axis of the pair of mirror seat hinges 16x. In the former case, where the mirror-down shock-absorbing lever 41 is biased in a direction to approach the axis of the pair of mirror seat hinges 16x, the shock-absorbing pin D1 is offset toward the side farther from the axis of the pair of mirror seat hinges 16x than the shock-absorbing contact portion 16c like the present embodiment of the mirror-down shock-absorbing lever 41 so that the mirror-down shock-absorbing lever 41 moves in a direction away from the axis of the pair of mirror seat hinges 16x when the shock-absorbing contact portion 16c presses the shock-absorbing pin D1. In the latter case, where the mirror-down shock-absorbing lever 41 is biased in a direction away from the axis of the pair of mirror seat hinges 16x, the shock-absorbing pin D1 is offset toward the side closer to the axis of the pair of mirror seat hinges 16x than the shock-absorbing contact portion 16c like the present embodiment of the mirror-up shock-absorbing lever 43 so that the mirror-down shock-absorbing lever 41 moves in a direction to approach the axis of the pair of mirror seat hinges 16x when the shock-absorbing contact portion 16c presses the shock-absorbing pin D1. However, in order to bias both the mirror-down shock-absorbing lever 41 and the mirror-up shock-absorbing lever 43 by a common spring such as the shock-absorbing spring 44, it is desirable that the mirror-down shock-absorbing lever 41 and the mirror-up shock-absorbing lever 43 be arranged to be capable of moving in directions orthogonal to each other.

When the movable mirror 15 is rotated to the mirror-down position that is shown in FIGS. 10 and 17, the stopper 16a comes into contact with the mirror-down position defining pin 20, so that the movable mirror 15 is prevented from further rotating downward (see FIG. 1). In this mirror-down state, the shock-absorbing contact portion 16c is spaced from the shock-absorbing pin D1, and both the mirror-down shock-absorbing lever 41 and the mirror-up shock-absorbing lever 43 are held in the respective shock-absorbing stand-by positions thereof by the biasing force of the shock-absorbing spring 44. In this state, if the movable mirror 15 which has reached the mirror-down position behaves (bounces) in such a manner as to move back toward the mirror-up position, the shock-absorbing contact portion 16c comes into contact with the shock-absorbing pin D1 of the mirror-down shock-absorbing lever 41 (adjustment member 42 that is held by the mirror-down shock-absorbing lever 41) which has returned to the shock-absorbing stand-by position. In order for the movable mirror 15 which has bounced in such a manner to further rotate toward the mirror-up position, it is required to press and move the mirror-down shock-absorbing lever 41 against the biasing force of the shock-absorbing spring 44; however, unlike the movement of the movable mirror 15 caused by the driving force of the mirror drive mechanism 30, a bounce of the movable mirror 15 caused by the inertia of the movable mirror 15 upon reaching the mirror-down position does not exert a force which is strong enough to move the mirror-down shock-absorbing lever 41, which is biased by the shock-absorbing spring 44, on the mirror-down shock-absorbing lever 41, so that the mirror-down shock-absorbing lever 41 substantially serves as a stopper for preventing the movable mirror 15 from bouncing to thereby limit the range of bouncing to the narrow range shown and defined by slide lines (dotted lines) and two-dot chain lines in FIG. 17.

As described above, when the movable mirror 15 rotates to the mirror-down position from the mirror-up position, the shock-absorbing contact portion 16c of the mirror seat 16 comes into contact with the shock-absorbing pin D1 of the mirror-down shock-absorbing lever 41 (adjustment member 42) and causes the load of the shock-absorbing spring 44 to be exerted on the movable mirror 15 to absorb shock of the movable mirror 15 while pressing and moving the mirror-down shock-absorbing lever 41 from the shock-absorbing stand-by position. Subsequently, the bounce of the movable mirror 15 after reaching the mirror-down position is suppressed by the mirror-down shock-absorbing lever 41 which has returned to the shock-absorbing stand-by position. Accordingly, the movable mirror 15 can be stabilized securely and stably at the mirror-down position by the mirror-down shock-absorbing lever 41, which is an independent shock-absorbing member.

As described above, in the mirror shock-absorbing mechanism 40 of the present embodiment of the camera 10, the mirror-up shock-absorbing lever 43, which is pressed and moved by absorbing the energy of the movement of the movable mirror 15 when the movable mirror 15 rotates to the mirror-up position, returns to the shock-absorbing stand-by position, at which the shock-absorbing contact portion 16c is positioned close to the shock-absorbing pin D2 within a range so as not to deteriorate the positional accuracy of the movable mirror 15, and limits the amount of bouncing of the movable mirror 15 when the movable mirror 15 reaches the mirror-up position. Likewise, the mirror-down shock-absorbing lever 41, which is pressed and moved by absorbing the energy of the movement of the movable mirror 15 when the movable mirror 15 rotates to the mirror-down position, returns to the shock-absorbing stand-by position, at which the shock-absorbing contact portion 16c is positioned close to the shock-absorbing pin D1 within a range so as not to deteriorate the positional accuracy of the movable mirror 15, and limits the amount of bouncing of the movable mirror 15 when the movable mirror 15 reaches the mirror-down position. Namely, unlike the type of shock-absorbing member which is brought to move aside to a position not related to the movement control of the movable mirror 15, each of the mirror-down shock-absorbing lever 41 and the mirror-up shock-absorbing lever 43 has the function of a stopper for curbing bounce of the movable mirror 15 after the movable mirror 15 reaches either rotational limit thereof in addition to the function of a damper when the movable mirror 15 rotates. Accordingly, the mirror shock-absorbing mechanism 40 can quickly and securely stop the movable mirror 15 at each of the mirror-down position and the mirror-up position, thus being capable of contributing to an improvement in continuous photographing capability even though the mirror shock-absorbing mechanism 40 is structured to have a small number of components and be simple in structure.

In addition, the number of biasers for the mirror-down shock-absorbing lever 41 and the mirror-up shock-absorbing lever 43 can be minimized because the present embodiment of the mirror shock-absorbing mechanism is structured such that the mirror-down shock-absorbing lever 41 and the mirror-up shock-absorbing lever 43 are biased to move by a common spring, namely, the shock-absorbing spring 44.

Although the present invention has been described with reference to the above illustrated embodiment of the mirror shock-absorbing mechanism, the present invention is not limited to this particular embodiment. For instance, although each of the mirror-down shock-absorbing lever 41 and the mirror-up shock-absorbing lever 43 is structured to serve as a shock-absorbing member which is characterized according to the present invention in the above illustrated embodiment of the mirror shock-absorbing mechanism 40, the present invention can be applied only to one of the following two types of shock-absorbing members: a shock-absorbing member which operates upon the movable mirror rotating to the mirror-up position, or a shock-absorbing member which operates upon the movable mirror rotating to the mirror-down position.

Additionally, although the above illustrated embodiment of the mirror shock-absorbing mechanism is provided on the mirror-down shock-absorbing lever 41 with a position adjusting mechanism (adjustment member 42) with which the position of the shock-absorbing pin D1 can be adjusted, the mirror shock-absorbing mechanism can be provided also with a similar position adjusting mechanism on the mirror-up shock-absorbing lever 43 with which the position of the shock-absorbing pin D2 can be adjusted.

Additionally, from the viewpoint of reduction in number of components, it is desirable that both the mirror-down shock-absorbing lever 41 and the mirror-up shock-absorbing lever 43 be biased by a common spring, for example, the shock-absorbing spring 44 as shown in the above illustrated embodiment; however, it is possible that the mirror-down shock-absorbing lever 41 and the mirror-up shock-absorbing lever 43 be biased by separate biasers. For instance, it is possible that an extension spring be installed to extend between the mirror-down shock-absorbing lever 41 and the mirror box 14 and another extension spring be installed to extend between the mirror-up shock-absorbing lever 43 and the mirror box 14.

Additionally, in the illustrated embodiment of the mirror shock-absorbing mechanism, the shock-absorbing pin D1 on the mirror-down shock-absorbing lever 41, the shock-absorbing pin D2 on the mirror-up shock-absorbing lever 43 and the shock-absorbing contact portion 16c on the movable mirror 15 are each formed into a projection having the shape of a regular circle in cross section. This shape is superior in regard to ease of manufacture, difficulty in occurrence of snagging when the shock-absorbing contact portion 16c comes into contact with the shock-absorbing pin D1 or the shock-absorbing pin D2, and capability of dealing with subtle dimensional errors on each product. However, the shapes of the contact portions (16c, D1 and D2) on the movable mirror and the shock-absorbing member are not limited solely to the shape of a regular circle in cross section. For instance, since the contact area of each of the shock-absorbing pin D1 and the shock-absorbing pin D2 against the shock-absorbing contact portion 16c in the above illustrated embodiment of the mirror shock-absorbing mechanism when sliding on the shock-absorbing contact portion 16c is limited to part of the outer periphery of the shock-absorbing pin, the remaining contact area of each shock-absorbing pin can be in the shape of a non-circle in cross section. Additionally, the contact surfaces of the shock-absorbing contact portion 16c, the shock-absorbing pin D1 and the shock-absorbing pin D2 can each be formed as a cam surface having a non-circular cross section, the shape of which is optimized so as to obtain both required shock-absorbing capability and bounce suppressing effect.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A movable mirror shock-absorbing mechanism of a camera, comprising:

a movable mirror which is supported to be rotatable between a viewfinder light-guiding position, in which said movable mirror is positioned in a photographing optical path to reflect incident light emanated from an object toward a viewfinder optical system of said camera, and a retracted position, in which said movable mirror is retracted from said photographing optical path to allow the object-emanated light to travel toward a photographic light-receiving medium; and a shock-absorbing member which includes a pressure receiving portion that is capable of contacting a mirror-side contact portion provided on said movable mirror, said shock-absorbing member being held by a biaser at a shock-absorbing stand-by position at which said pressure receiving portion is positioned in a moving path of said mirror-side contact portion, and said shock-absorbing member being movable in a direction to retract said pressure receiving portion from said moving path of said mirror-side contact portion, wherein said shock-absorbing member is held at said shock-absorbing stand-by position with said pressure receiving portion spaced from said mirror-side contact portion when said movable mirror is at one of said viewfinder light-guiding position and said retracted position, and wherein, when said movable mirror rotates between said viewfinder light-guiding position and said retracted position, said mirror-side contact portion presses said pressure receiving portion to move said shock-absorbing member from said shock-absorbing stand-by position against a biasing force of said biaser, said shock-absorbing member returns to said shock-absorbing stand-by position by said biasing force of said biaser after the pressing of said mirror-side contact portion against said pressure receiving portion is released, and an amount of bouncing of said movable mirror is limited by a contact engagement between said mirror-side contact portion and said pressure receiving portion when said movable mirror bounces.

2. The movable mirror shock-absorbing mechanism according to claim 1, wherein said shock-absorbing member is supported to be movable linearly in a direction intersecting said moving path of said mirror-side contact portion that is defined when said movable mirror rotates.

3. The movable mirror shock-absorbing mechanism according to claim 1, wherein said mirror-side contact portion and said pressure receiving portion comprise projections, outer peripheral surfaces of which slide on each other when said shock-absorbing member is pressed and moved by said movable mirror.

4. The movable mirror shock-absorbing mechanism according to claim 1, wherein said shock-absorbing member comprises a position adjusting mechanism, wherein a position of said pressure receiving portion can be adjusted relative to said mirror-side contact portion via said position adjusting mechanism.

5. The movable mirror shock-absorbing mechanism according to claim 1, wherein said shock-absorbing member comprises:
   a first shock-absorbing member which prevents said movable mirror from bouncing at said viewfinder light-guiding position; and
   a second shock-absorbing member which prevents said movable mirror from bouncing at said retracted position.

6. The movable mirror shock-absorbing mechanism according to claim 5, wherein said first shock-absorbing member and said second shock-absorbing member are supported to be movable linearly in directions orthogonal to each other.

7. The movable mirror shock-absorbing mechanism according to claim 5, wherein said first shock-absorbing member and said second shock-absorbing member are biased toward respective shock-absorbing stand-by positions thereof by a common said biaser.

8. The movable mirror shock-absorbing mechanism according to claim 7, wherein said biaser comprises a torsion spring including a coil portion which is supported by a support projection, which projects from a mirror box provided in said camera which supports said movable mirror; and a pair of arm portions which extend from said coil portion to be engaged with said first shock-absorbing member and said second shock-absorbing member, respectively.

9. The movable mirror shock-absorbing mechanism according to claim 6, wherein said camera comprises a mirror box which includes a pair of laterally-opposed side walls and which accommodates and supports said movable mirror between said pair of laterally-opposed side walls, and wherein said first shock-absorbing member and said second shock-absorbing member are positioned alongside one of said pair of laterally-opposed side walls and are supported by said one of said pair of laterally-opposed side walls to be movable linearly in said directions orthogonal to each other.

10. The movable mirror shock-absorbing mechanism according to claim 1, wherein said biaser comprises a spring.

11. A movable mirror shock-absorbing mechanism of a camera, comprising:
   a movable mirror which is supported to be rotatable between a viewfinder light-guiding position, in which said movable mirror is positioned in a photographing optical path to reflect incident light emanated from an object toward a viewfinder optical system of said camera, and a retracted position, in which said movable mirror is retracted from said photographing optical path to allow the object-emanated light to travel toward a photographic light-receiving medium;
   a first shock-absorbing member which is pressed by said movable mirror and absorbs the momentum of said movable mirror when said movable mirror rotates from said retracted position to said viewfinder light-guiding position;
   a second shock-absorbing member which is pressed by said movable mirror and absorbs the momentum of said movable mirror when said movable mirror rotates from said viewfinder light-guiding position to said retracted position; and
   a common biaser which biases said first shock-absorbing member and said second shock-absorbing member toward respective shock-absorbing stand-by positions, at which said first shock-absorbing member and said second shock-absorbing member apply a load against the pressing movement of said movable mirror.

12. The movable mirror shock-absorbing mechanism according to claim 11, wherein said first shock-absorbing member and said second shock-absorbing member are supported to be movable linearly in directions orthogonal to each other.

13. The movable mirror shock-absorbing mechanism according to claim 11, wherein said common biaser comprises a torsion spring including a coil portion which is supported by a support projection, which projects from a mirror box provided in said camera which supports said movable mirror; and a pair of arm portions which extend from said coil portion to be engaged with said first shock-absorbing member and said second shock-absorbing member, respectively.

* * * * *